(12) United States Patent
Iizuka et al.

(10) Patent No.: US 11,507,076 B2
(45) Date of Patent: Nov. 22, 2022

(54) NETWORK ANALYSIS PROGRAM, NETWORK ANALYSIS DEVICE, AND NETWORK ANALYSIS METHOD

(71) Applicant: FUJITSU LIMITED, Kawasaki (JP)

(72) Inventors: Fumiyuki Iizuka, Kawasaki (JP); Hitoshi Ueno, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 266 days.

(21) Appl. No.: 16/897,654

(22) Filed: Jun. 10, 2020

(65) Prior Publication Data

US 2021/0026341 A1 Jan. 28, 2021

(30) Foreign Application Priority Data

Jul. 24, 2019 (JP) .............................. JP2019-136265

(51) Int. Cl.
*G05B 23/02* (2006.01)
*G05B 13/04* (2006.01)
*G06K 9/62* (2022.01)

(52) U.S. Cl.
CPC ....... *G05B 23/0254* (2013.01); *G05B 13/042* (2013.01); *G05B 23/024* (2013.01); *G05B 23/0232* (2013.01); *G06K 9/6252* (2013.01)

(58) Field of Classification Search
None
See application file for complete search history.

(56) References Cited

U.S. PATENT DOCUMENTS 11,181,894 B2 * 11/2021 Cantrell ............. G05B 23/0235
2009/0052330 A1 * 2/2009 Matsunaga ........... H04L 1/0019
370/242

(Continued)

FOREIGN PATENT DOCUMENTS

JP 2011-145846 A 7/2011
JP 2018-521611 A 8/2018

OTHER PUBLICATIONS

Rancisco Louzada et al. "Classification methods applied to credit scoring: A systematic review and overall comparison", arxiv.org, Cornell University Library, 201 Olin Library Cornell University Ithaca, NY14853, Feb. 5, 2016, XP080681826. Cited in extended European search report issued for corresponding European patent application No. 20181375.5, dated Dec. 11, 2020.

(Continued)

*Primary Examiner* — Mohammad Ali
*Assistant Examiner* — David Earl Ogg
(74) *Attorney, Agent, or Firm* — Fujitsu Patent Center

(57) ABSTRACT

A computer readable network analysis program of performing local modeling analysis of determining an estimated value of a current network quality corresponding to explanatory variable vector in current aggregated data based on a local model including local training data; determining an abnormality in the network based on whether or not a measured value of the current network quality is lower than a threshold; determining whether or not a distribution of the connections having the measured value of the network quality exceeding the threshold is present in a large size; extracting an individual-analysis-target connection group including more than predetermined proportions of connections in the distribution of the connections having the large size; and performing the local modeling analysis to the individual-analysis-target connection group and the remaining connection groups to determine the abnormality in the network.

10 Claims, 27 Drawing Sheets

(56) References Cited

U.S. PATENT DOCUMENTS

| | | | |
|---|---|---|---|
| 2011/0185235 A1 | 7/2011 | Iizuka | |
| 2012/0316835 A1 | 12/2012 | Maeda et al. | |
| 2014/0204799 A1* | 7/2014 | Pietrowicz | H04L 41/12 370/254 |
| 2015/0195296 A1* | 7/2015 | Vasseur | H04L 63/1425 726/23 |
| 2016/0226901 A1* | 8/2016 | Baikalov | H04L 63/1425 |
| 2016/0359886 A1* | 12/2016 | Yadav | H04L 43/062 |
| 2017/0094537 A1* | 3/2017 | Yang | H04L 41/0631 |
| 2018/0077172 A1 | 3/2018 | Sartran et al. | |
| 2018/0212849 A1 | 7/2018 | Hobgood et al. | |
| 2018/0248905 A1* | 8/2018 | Côté | H04L 63/1441 |
| 2018/0367551 A1* | 12/2018 | Muddu | G06N 20/00 |
| 2019/0166024 A1* | 5/2019 | Ho | H04L 43/0823 |

OTHER PUBLICATIONS

Muhammad Qasim Ali et al. "Automated Anomaly Detector Adaptation using Adaptive Threshold Tuning", ACM Transactions on Information and System Security, ACM, New York, NY, US, vol. 15, No. 4, Apr. 30, 2013, pp. 1-30, XP058014894. Cited in extended European search report issued for corresponding European patent application No. 20181375.5, dated Dec. 11, 2020.

EESR—Extended European Search Report issued for corresponding European patent application No. 20181375.5, dated Dec. 11, 2020.

* cited by examiner

FIG. 16

| RESULT OF OVERALL ABNORMALITY DETERMINATION FOR CG | RESULT OF ABNORMALITY DETERMINATION FOR CG EXCEPT FOR CG_E | RESULT OF ABNORMALITY DETERMINATION FOR CG_E | RESULT OF FINAL DETERMINATION | ALARM NOTIFICATION | RESPONSE TO FEEDBACK (INDICATING ADEQUATE/INADEQUATE ALARM) (OPTIMIZATION OF N) |
|---|---|---|---|---|---|
| ABNORMAL | ABNORMAL | ABNORMAL | ABNORMAL (CG ARE OVERALL ABNORMAL) | PRESENT (OR ALARM TYPE 1) | FOR ADEQUATE ALARM: NO ACTION IS TAKEN FOR INADEQUATE ALARM: N IS INCREASED |
| ABNORMAL | ABNORMAL | NORMAL | ABNORMAL (ANY OF CG_A TO CG_D OTHER THAN CG_E IS ABNORMAL) | PRESENT (OR ALARM TYPE 2) | FOR ADEQUATE ALARM: NO ACTION IS TAKEN FOR INADEQUATE ALARM: N IS INCREASED |
| ABNORMAL | NORMAL | ABNORMAL | ABNORMAL (CG_E IS ABNORMAL) | PRESENT (OR ALARM TYPE 3) | FOR ADEQUATE ALARM: NO ACTION IS TAKEN FOR INADEQUATE ALARM: N IS INCREASED |
| ABNORMAL (ERRONEOUS DETERMINATION) | NORMAL | NORMAL | NOT ABNORMAL (RATIO AMONG CG_A TO CG_D AND CG_E HAS CHANGED) | ABSENT (OR ALARM TYPE 4) | FEEDBACK TRANSMITTER IS NOT FEEDBACK TARGET |

FIG. 19

ANALYSIS DATA DURING ABNORMAL DETERMINATION PERIOD
(EXTRACTED UNDER CONDITION-1)

| L4 ANALYSIS TIME | SOURCE IP [src_IP] (Host A) | DESTINATION IP [dst_IP] (Host B) | PROTOCOL NUMBER [Prot_No] | SOURCE Port [src_Port] | DESTINATION Port [dst_Port] | A-TO-B NUMBER OF PACKETS | A-TO-B NUMBER OF BYTES | A-TO-B NUMBER OF LOST PACKETS | A-TO-B NUMBER OF LOSS RATE |
|---|---|---|---|---|---|---|---|---|---|
| 2018/05/22 12:50:00 | 10.20.30.40 | 10.20.30.50 | 6 | 2000 | 20 | 225 | 12504 | 15 | 6.67 |
| 2018/05/22 12:50:00 | 20.30.40.50 | 10.20.30.50 | 6 | 3000 | 80 | 2468 | 200200 | 2 | 0.08 |
| 2018/05/22 12:50:00 | 20.30.40.70 | 10.20.30.50 | 6 | 3000 | 20 | 246 | 30200 | 1 | 0.04 |
| ... | ... | ... | | | | | | | |
| 2018/05/22 12:51:00 | 10.20.30.41 | 10.20.30.50 | 6 | 2100 | 20 | 500 | 15040 | 38 | 7.60 |
| 2018/05/22 12:51:00 | 10.20.30.45 | 10.20.30.50 | 6 | 2006 | 20 | 540 | 17880 | 29 | 5.37 |
| ... | ... | ... | | | | | | | |

S40 ACQUIRE ANALYSIS DATA FOR EACH CONNECTION DURING ABNORMAL DETERMINATION PERIOD

S43 SEPARATE CONNECTION GROUPS USING SOURCE IP[src_IP]:
10.20.30.40
10.20.30.41
10.20.30.45
AND EQUAL TO OR LOWER THAN DISTRIBUTION PEAK MT2 FROM OTHER CONNECTION GROUPS

S41 ESTIMATE DISTRIBUTION OF NUMBER OF CONNECTIONS×LOSS RATE

S42 DETECT DISTRIBUTION PEAK MT2 HIGHER THAN VALLEY VAL

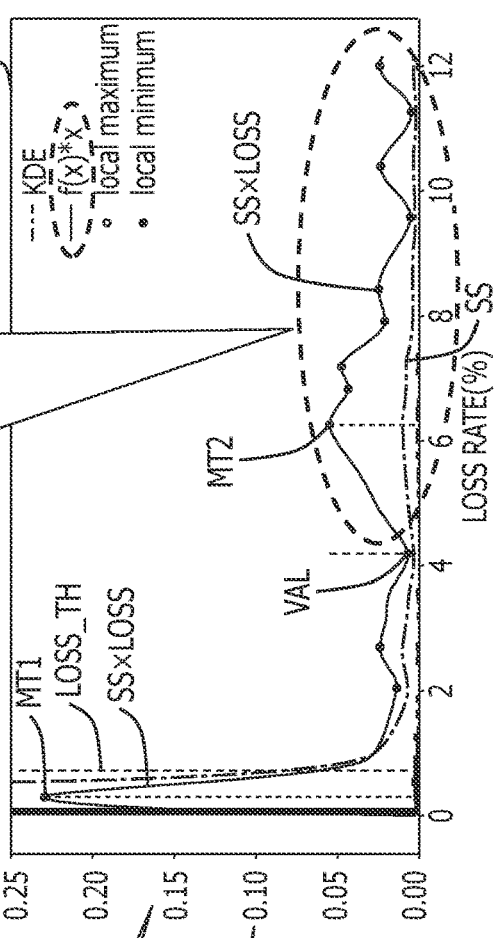

FIG. 24

SETTING OF TRAINING DATA EXTRACTION CONDITION

| CONDITION NUMBER | EXTRACTION CONDITION |
|---|---|
| CONDITION-1 | [Prot_No]6, [dst_IP] 10.20.30.50 |
| CONDITION-2 | [Prot_No]6, [src_IP] 20.30.0.0/16 |

SETTING OF DETERMINATION TARGET ITEM

| DETERMINATION TARGET NUMBER | DETERMINATION TARGET ITEM | EXTRACTION CONDITION NUMBER | FACTOR N OF NORMAL RANGE Nσ |
|---|---|---|---|
| DETERMINATION-1 | SERVER PROCESSING TIME | CONDITION-1 | 3.5 |
| DETERMINATION-2 | A-TO-B LOSS RATE | CONDITION-1 | 3 |
| DETERMINATION-3 | B-TO-A LOSS RATE | CONDITION-1 | 3 |
| DETERMINATION-4 | RTT | CONDITION-1 | 3 |
| DETERMINATION-5 | B-TO-A LOSS RATE | CONDITION-2 | 3 |

PATTERN 1
NW ANALYSIS DATA (CONNECTION GROUPS CG_A-D EXTRACTED UNDER CONDITION-1 DURING ABNORMAL DETERMINATION PERIOD) DB3_1

| TIME | SOURCE IP [src_IP] | DESTINATION IP [dst_IP] (Host B) | PROTOCOL NUMBER [Prot_No] | SOURCE Port [src_Port] | DESTINATION Port [dst_Port] | A-TO-B NUMBER OF PACKETS | A-TO-B NUMBER OF BYTES | A-TO-B NUMBER OF LOST PACKETS | ... |
|---|---|---|---|---|---|---|---|---|---|
| 2018/05/22 12:50:00 | 10.50.30.50 | 10.20.30.50 | 6 | 1006 | 20 | | | | |
| 2018/05/22 12:51:00 | 20.50.30.70 | 10.20.30.50 | 6 | 4606 | 20 | | | | |
| ... | | | | | | | | | |

↓ PERFORM TIME-PERIOD-BASED AGGREGATION

DB3_2

| TIME | AGGREGATION CONDITION NUMBER | NUMBER OF CONNECTIONS | A-TO-B NUMBER OF PACKETS | A-TO-B NUMBER OF BYTES | A-TO-B NUMBER OF LOST PACKETS | A-TO-B NUMBER OF LOSS RATE | ... |
|---|---|---|---|---|---|---|---|
| 2018/05/22 12:50:00 | CONDITION-1 | 1002 | 104500 | 8152290 | 40 | 0.04 | |
| 2018/05/22 12:51:00 | CONDITION-1 | | | | | | |
| ... | | | | | | | |

⇒ JIT ANALYSIS

PATTERN 2
NW ANALYSIS DATA (CONNECTION GROUP CG_E EXTRACTED UNDER CONDITION-1 DURING ABNORMAL DETERMINATION PERIOD) DB3_1

| TIME | SOURCE IP [src_IP] (Host A) | DESTINATION IP [dst_IP] (Host B) | PROTOCOL NUMBER [Prot_No] | SOURCE Port [src_Port] | DESTINATION Port [dst_Port] | A-TO-B NUMBER OF PACKETS | A-TO-B NUMBER OF BYTES | A-TO-B NUMBER OF LOST PACKETS | ... |
|---|---|---|---|---|---|---|---|---|---|
| 2018/05/22 12:50:00 | 10.20.30.41 | 10.20.30.50 | 6 | 2100 | 20 | | | | |
| 2018/05/22 12:51:00 | 10.20.30.45 | 10.20.30.50 | 6 | 2006 | 20 | | | | |
| ... | | | | | | | | | |

↓ PERFORM TIME-PERIOD-BASED AGGREGATION

DB3_2

| TIME | AGGREGATION CONDITION NUMBER | NUMBER OF CONNECTIONS | A-TO-B NUMBER OF PACKETS | A-TO-B NUMBER OF BYTES | A-TO-B NUMBER OF LOST PACKETS | A-TO-B NUMBER OF LOSS RATE | ... |
|---|---|---|---|---|---|---|---|
| 2018/05/22 12:50:00 | CONDITION-1 | 12 | 3288 | 154080 | 88 | 2.68 | |
| 2018/05/22 12:51:00 | CONDITION-1 | | | | | | |
| ... | | | | | | | |

⇒ JIT ANALYSIS

NETWORK ANALYSIS PROGRAM, NETWORK ANALYSIS DEVICE, AND NETWORK ANALYSIS METHOD

CROSS-REFERENCE TO RELATED APPLICATION

This application is based upon and claims the benefit of priority of the prior Japanese Patent Application No. 2019-136265, filed on Jul. 24, 2019, the entire contents of which are incorporated herein by reference.

FIELD

The present invention relates to a network analysis program, a network analysis device, and a network analysis method.

BACKGROUND

A network analysis device determines that a network is abnormal when a measured value of a packet loss rate or a throughput serving as one of indices of a network quality is worse (i.e., the packet loss rate is higher or the throughput is lower) than an abnormality determination threshold set based on a previous measured value in a normal state.

The network analysis device also captures communication packets in a plurality of connections by duplicating, through packet mirroring, the communication packets using, e.g., a router or switch at an access point to an entrance of a data center on a communication path on which the packets propagate. Then, the network analysis device aggregates and analyzes network analysis data (such as, e.g., the number of packets, the number of bytes, the number of lost packets, and a round trip time (RTT)) obtained by analyzing captured packet data for each of the connections, produces a determination criterion, such as the abnormality determination threshold, from previous analysis results, and determines whether or not a current network quality is abnormal.

To meet a demand for a reduction in network quality monitoring cost, the network analysis device collectively analyzes the network analysis data sets for the plurality of connections to obtain, e.g., an average of the packet loss rates. Consequently, when the number of connections for accessing a service decreases during an out-of-service period such as at night, the number of packets simultaneously decreases from that in a normal state such as during an in-service period, and the average value of the packet loss rates increases due to a reduction in the total number of the packets even though the number of lost packets has not increased, an abnormality in the network is detected even though a network state is not necessarily abnormal. In this case, the network analysis device generates an exaggerated alarm.

When a margin of the abnormality determination threshold is excessively increased to prevent the exaggerated alarm from being generated, even though an abnormality has actually occurred in the network, the network analysis device cannot (is not able to) generate a necessary (adequate) alarm.

From the viewpoint described above, the network analysis device uses just-in-time modeling (JIT modeling) to estimate a current network quality reflecting a tendency of a relationship between a previous network use state and a previous network quality (e.g., packet loss rate), and determines an abnormality in the network based on the abnormality determination threshold obtained by adding, to an estimated value of the network quality, a normal range set based on variations in a network quality in a local model in JIT analysis. The network analysis device also adjusts the set normal range based on a feedback sent from an operator of a communication system in response to the alarm generated when the abnormality was determined to allow an alarm notification intended by the system operator to be performed.

Through the JIT analysis using the JIT modeling described above, the network analysis device determines an abnormality in the network based on the abnormality determination threshold reflecting the tendency of the previous network quality of the network and variations therein. This allows the network analysis device to perform appropriate abnormality determination even when the number of packets is small. A network analysis method is disclosed in Published Japanese translation of PCT international application JP2018-521611 and Japanese Laid-open patent publication number JP2018-145846.

SUMMARY

However, when there is a communication node group belonging to one or a plurality of sub-networks, such as bases classified based on an organization of a company or the like, a plurality of connections using the same communication node group as a source or a destination are established, and communication is performed. The plurality of connections using the same communication node group as the source or the destination are hereinafter referred to as a connection group.

When there are a plurality of bases and network analysis data for the plurality of connection groups is to be aggregated and analyzed, it is difficult to distinguish the following two abnormal states from each other. Specifically, the two abnormal states correspond to: a case (1) where a ratio among the respective numbers of communication samples in the plurality of connection groups is the same as that at normal times, but a packet loss rate in one of the connection groups becomes higher than that at normal times, an average packet loss rate in the plurality of connection groups as a whole exceeds the abnormality determination threshold, and an abnormality in the network is detected; and a case (2) where the ratio among the respective numbers of communication samples in the plurality of connection groups is different from that at normal times, a high packet loss rate in the one of the connection groups usually having a poor communication quality and a high packet loss rate due to a narrow band or the like becomes conspicuous, the overall average packet loss rate exceeds the abnormality determination threshold, and a network abnormality is detected. In the state corresponding to the case (2), a ratio of the number of measured values of the high packet loss rate in the specified connection group usually having a communication quality lower than that of another connection group to the number of measured values of a less high packet loss rate in the other connection group is high, and consequently an overall average packet loss rate is high.

There is a case where, in response to an alarm generated when an abnormality is determined in the case (1) described above, the operator returns a feedback indicating that the generated alarm is necessary (adequate) but, in response to an alarm generated when an abnormality is determined in the case (2) described above, the operator returns a feedback indicating that the generated alarm is unnecessary (inadequate). On receipt of the feedback, correction is made so as to bring the loss rate in the state corresponding to the case (2) into a normal range and the normal range of the abnormality determination threshold is shifted to a higher region. This results in a problem in that the network analysis device is not able to determine that an abnormality subsequently occurring in the case 1 is an abnormality.

The first aspect of the present embodiment is a non-transitory computer-readable storage medium storing therein a computer readable network analysis program for causing a computer to execute processing including:

performing local modeling analysis which determines an estimated value of a current network quality corresponding to explanatory variable vector in current aggregated data based on a local model including local training data, the local training data including explanatory variable vectors that are within a predetermined distance from an explanatory variable vector in the current aggregated data among explanatory variable vectors in previous training data, the previous training data being time-period-based training data that is obtained by aggregating, in a plurality of connection groups each including same communication node group as a source or a destination, previous network analysis data of connections which is obtained by acquiring packets in the plurality of connection groups on a communication path of a network and analyzing the acquired packets, and the current aggregated data being obtained by aggregating, in the plurality of connection groups, current network analysis data of connections;

determining an abnormality in the network based on whether or not a measured value of the current network quality is lower than an abnormality determination threshold calculated based on the estimated value;

performing distribution determination of determining whether or not a distribution of the connections having the measured value of the network quality exceeding the abnormality determination threshold is present in a size equal to or larger than a predetermined size in the network analysis data for the connections during an abnormal time block during which the abnormality in the network is determined;

extracting, as an individual-analysis-target connection group, a specified connection group with equal to or more than a standard proportion of connections in the distribution of the connections having the size equal to or larger than the predetermined size; and individually subjecting, to the local modeling analysis, the previous training data and the current aggregated data for the individual-analysis-target connection group and the previous training data and the current aggregated data for those of the plurality of connection groups other than the individual-analysis-target connection group to determine the abnormality in the network.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is a table illustrating the alarm notification to the feedback target.

FIG. 19 is a chart illustrating details of the processing steps S41 and S42 each described above.

FIG. 24 is a diagram illustrating an example of setting of the data extraction conditions and an example of setting of the determination target items.

FIG. 28 is a chart illustrating an example of the training data DB2 for each of the connection groups in the processing steps S44 and S45, FIG. 29 is a chart illustrating an example of network analysis data DB3 for each of the connection groups during the abnormal determination period in the processing step S40.

DESCRIPTION OF EMBODIMENTS

First Embodiment

A description will be given below of a network analysis device in a first embodiment. First, a communication network to which the first embodiment is applied and analysis (hereinafter referred to as JIT analysis) of a state of the network using JIT modeling will be described. After erroneous determination of a network state is described, a description will be given of the network analysis device according to the first embodiment.

Communication Network

Figure 1:
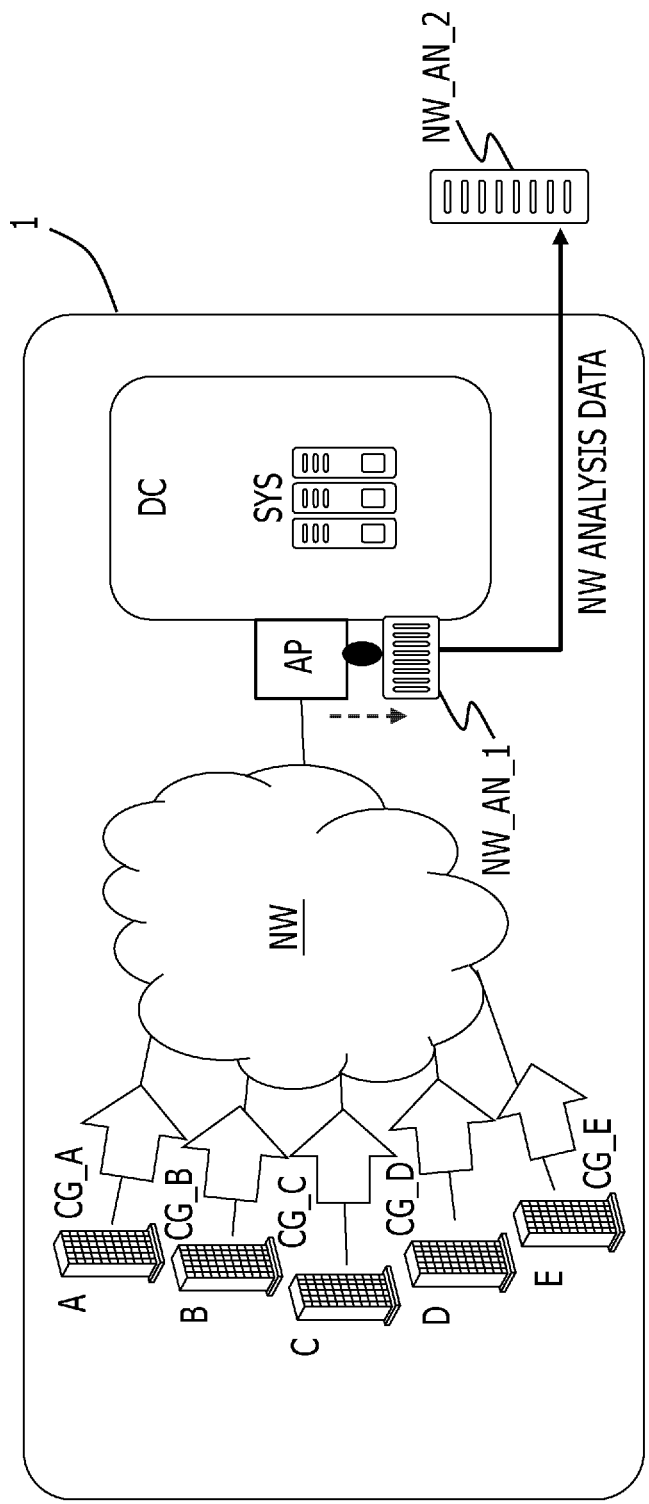
FIG. 1 is a diagram illustrating an example of the communication network to which the present embodiment is applied.

FIG. 1 is a diagram illustrating an example of the communication network to which the present embodiment is applied. A communication network 1 includes a plurality of bases A to E in a company, a service system SYS in a data center DC, and a network NW connecting the bases A to E and the service system SYS. At each of the bases, one or a plurality of sub-networks are formed.

Between a plurality of communication nodes (terminals) belonging to the sub-networks at the individual bases and the service system SYS, connection groups CG_A to CG_E are established. A communication node group (terminal group) at the individual bases starts to communicate with the service system SYS, and packets transmitted or received by the communication nodes (terminals) are received or transmitted by destinations in the service system via the network NW and access points AP in the service system SYS.

The communication node group is hereinafter defined as a group of a plurality of communication nodes (terminals) belonging to one or a plurality of sub-networks at bases classified based on an organization of a company or the like. The connection group is defined as a group including a plurality of connections using the same communication node group as a source or a destination. Schematically speaking, between the respective communication node groups at the individual bases and the service system SYS in the data center, the individual connection groups CG_A to CG_E are established (formed).

In the communication network 1, a network analyzation device NW_AN_1 is provided to capture (acquire) packets in the individual connections at, e.g., the access points AP on communication paths and analyze a network quality index for each of the connections. The network analyzation device NW_AN_1 analyzes the captured packets in the connections in the plurality of connection groups CG_A to CG_E and calculates, as network analysis data, a measured value of a network quality or a communication throughput. The network quality includes the number of packets, the number of bytes, and the number of lost packets (which will be converted later to a packet loss rate by a network analysis device NW_AN_2) in each of the connections, an RTT (Return Travel Time) of each of the packets, a server processing time, and the like. The network quality and the communication throughput serve as indices for determining the network state.

The network analysis device NW_AN_2 connected to the network analyzation device NW_AN_1 performs conditional extraction/aggregation/analysis of the network analysis data such as a communication amount and the network quality to perform abnormality determination for the network, which is determination of whether or not the network is abnormal. When determining an abnormality in the network, the network analysis device generates an alarm to notify an administrator of the communication network 1 of the abnormality in the network as necessary (as appropriate).

Network Abnormality Determination

Figure 2:
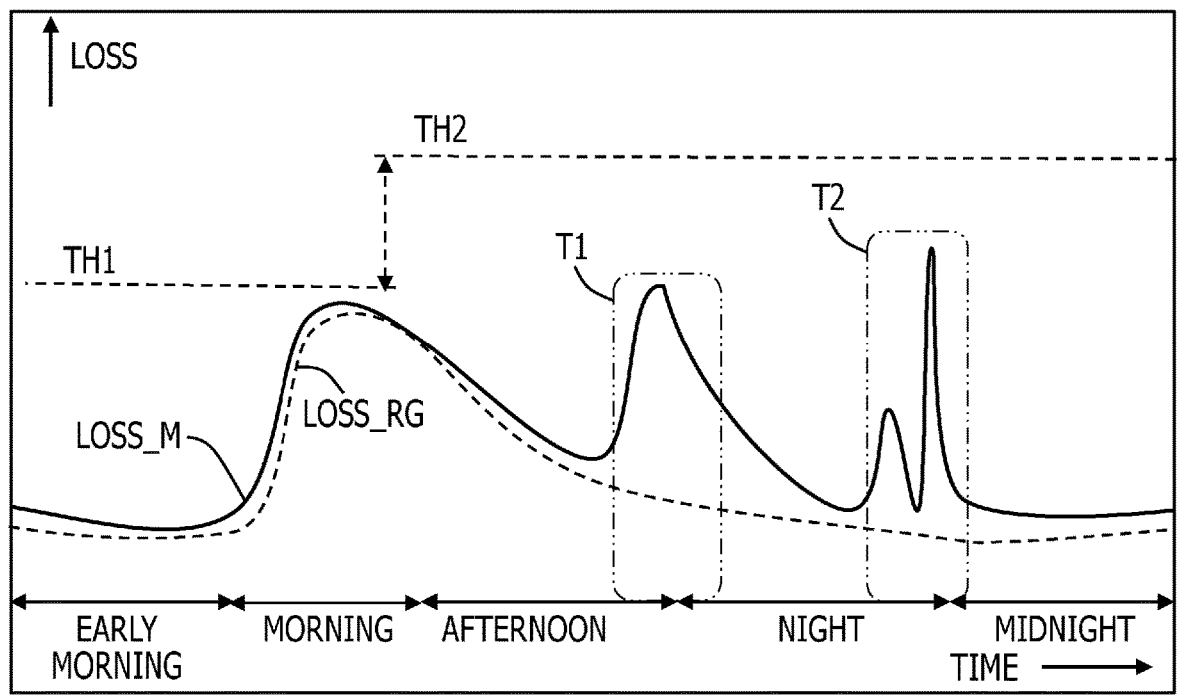
FIG. 2 is a graph illustrating a first network abnormality determination method.

FIG. 2 is a graph illustrating a first network abnormality determination method. In FIG. 2, a horizontal direction represents a time TIME, while a vertical direction represents a packet loss rate LOSS included in the network quality. In the first network abnormality determination method, the network analysis device sets an abnormality determination threshold TH1 based on measured values LOSS_RG of previous packet loss rates at normal times in the plurality of connection groups each as a monitoring target, and determines whether or not the network is abnormal based on whether or not an average value of measured values LOSS_M of current packet loss rates in the plurality of connection groups is over the abnormality determination threshold TH1, For example, the abnormality determination threshold TH1 is set to a constant multiple of a maximum value of the measured values of the previous packet loss rates at normal times.

In the network abnormality determination method, as observed at a time T2, there is a case where a night-time communication amount becomes smaller than a normal communication amount to reduce the number of the connections, the measured values LOSS_M of the packet loss rates with respect to the current numbers of lost packets, which are equal to the numbers of lost packets at normal times, rapidly increase to exceed the abnormality determination threshold TH1, and an exaggerated alarm is generated. When determination is made using an abnormality determination threshold TH2 having a margin larger than that of the abnormality determination threshold TH1 or more strict alarm notification conditions are set to prevent the exaggerated alarm, there is a case as observed as a time T1 where, even when the measured values LOSS_M of the current packet loss rates increase due to an abnormality in the network, the abnormality determination threshold TH2 is not exceeded by the measured value LOSS_M and a necessary (adequate) alarm notification is not performed.

Figure 3:
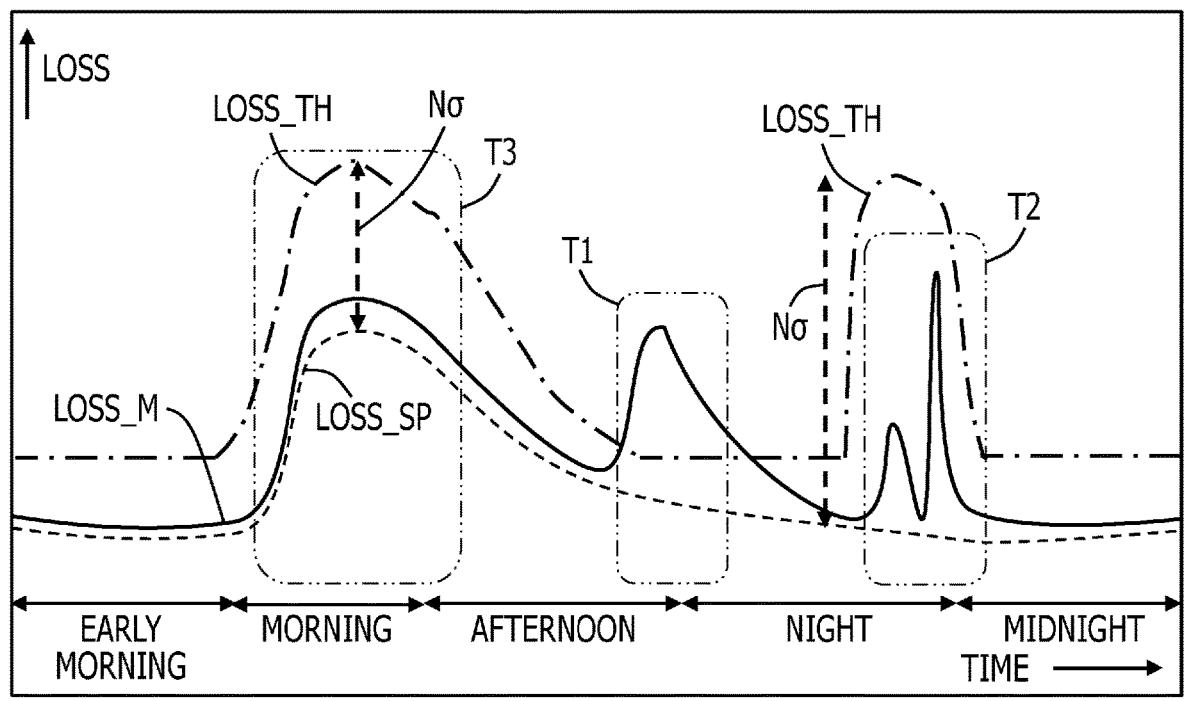
FIG. 3 is a graph illustrating a second network abnormality determination method using a JIT model.

FIG. 3 is a graph illustrating a second network abnormality determination method using a JIT model. In the second network abnormality determination method (hereinafter referred to as the MT analysis) using the JIT model, the network analysis device (1) extracts, from training data including a plurality of explanatory variables (communication amount such as the number of bytes and the number of packets) included in previous network analysis data and an objective variable (packet loss rate) thereof, a sample close to explanatory variable vector information included in current network analysis data as a local model, and (2) calculates an estimated value LOSS_SP of the packet loss rate with respective to current explanatory variables based on a relationship between the explanatory variables and the objective variable in the local model. Additionally, the network analysis device adds, to the calculated estimated value LOSS_SP, a normal range No obtained by multiplying, by a factor N, a standard deviation σ representing a dispersion of the objective variable in the local model extracted from the training data to set an abnormality determination threshold LOSS_TH of the packet loss rate. The abnormality determination threshold LOSS_TH is not constant but varies over time.

Then, the network analysis device determines whether or not the measured value LOSS_M of the current packet loss rate is over the abnormality determination threshold LOSS_TH, and detects an abnormality in the network when the abnormality determination threshold LOSS_TH is exceeded by LOSS_M.

Figure 4:
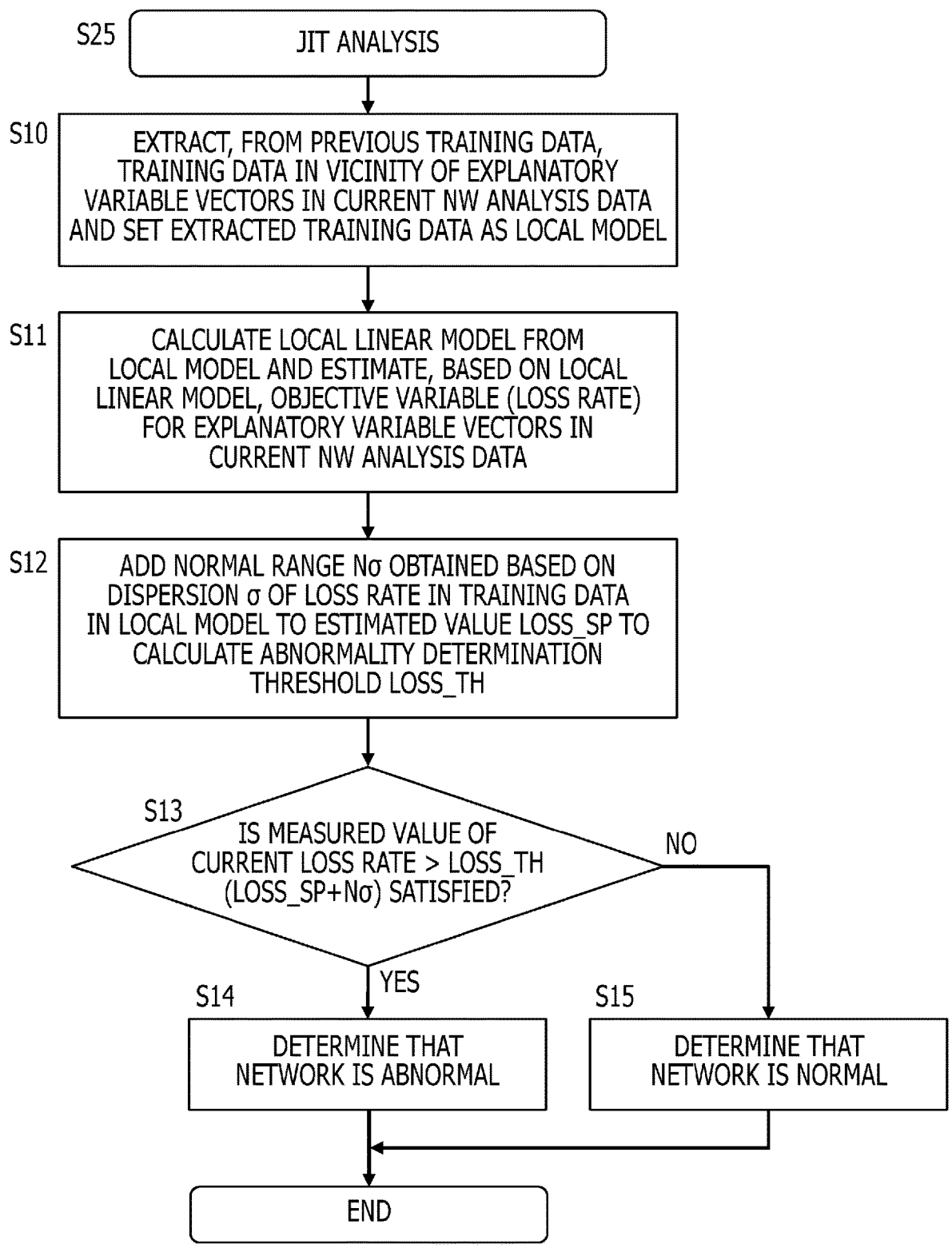
FIG. 4 is a chart illustrating a flow chart of the MT analysis method.
Figure 5:
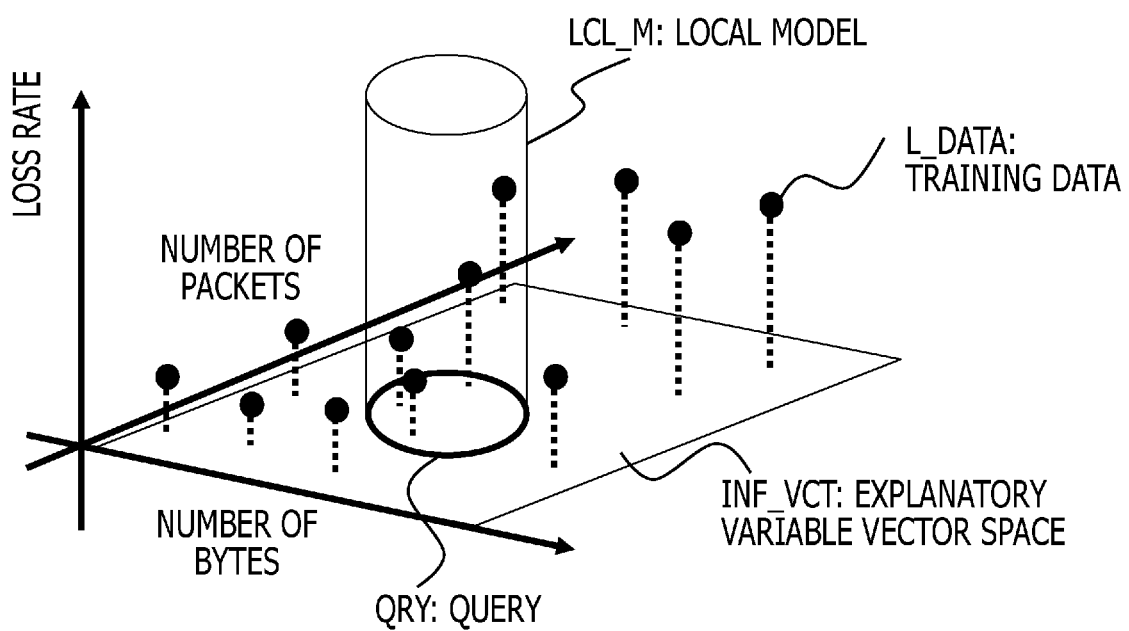
FIGS. 5 and 6 are graphs illustrating the JIT analysis method.
Figure 6:
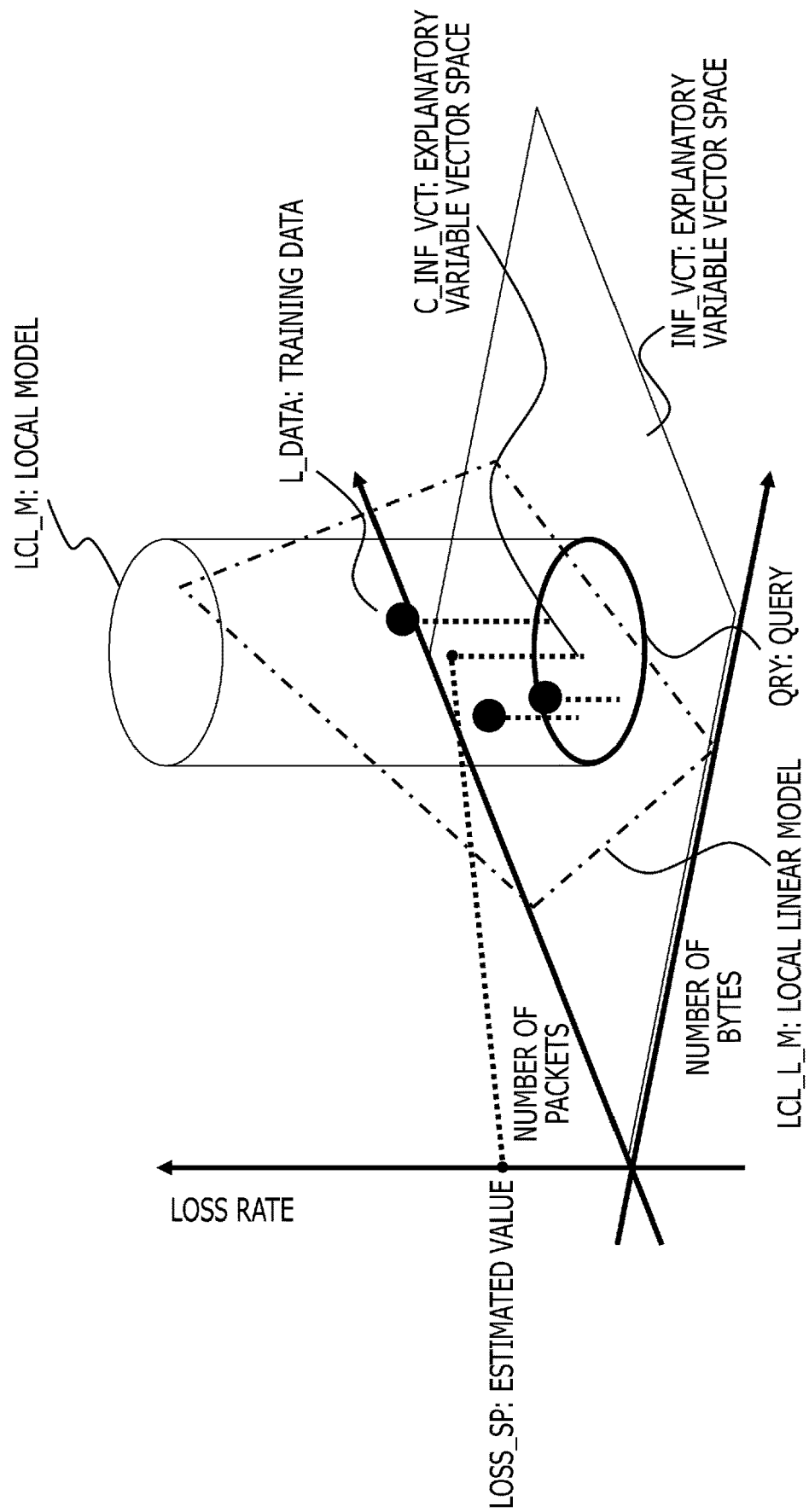

FIG. 4 is a chart illustrating a flow chart of the JIT analysis method. FIGS. 5 and 6 are graphs illustrating the JIT analysis method.

First, the network analysis device extracts, from the training data that is aggregated data of the previous network analysis data, training data including vectors of the explanatory variables (e.g., the number of packets and the number of bytes) which are within a predetermined distance from vectors of the explanatory variables related to the communication amount in the current network analysis data, and uses the extracted training data as the local model (S10). For example, the training data is vectors of two explanatory variables (e.g., the number of packets and the number of bytes) and one objective variable (e.g., packet loss rate).

FIG. 5 illustrates a space INF_VCT of two-dimensional vectors of the number of packets and the number of bytes serving as the explanatory variables, which is taken with respect to a vertical axis representing the objective variable (packet loss rate) of the training data. First, the network analysis device places previous training data sets L_DATA on the graph of FIG. 5. Then, the network analysis device uses the vectors of the explanatory variables (the number of packets and the number of bytes) in the current network analysis data as a query QRY in the vector space INF_VCT The network analysis device extracts training data including the explanatory variable vectors within the predetermined distance from the query QRY, and uses the extracted training data as a local model LCL_M, For example, the predetermined distance mentioned herein is an L2 norm or the like.

Next, as illustrated in FIG. 6, the network analysis device calculates, from the plurality of training data sets L_DATA in the local model LCL_M, a local linear model LCL_L_M and estimates, based on the local linear model, the estimated value LOSS_SP of the objective variable (packet loss rate) for the vector INF_VCT of the current explanatory variables (S11).

In addition, the network analysis device calculates the standard deviation σ based on the dispersion of the packet loss rates in the plurality of training data sets included in the local model and adds the normal range Nσ obtained by multiplying the standard deviation a by the factor N to the estimated value LOSS_SP of the packet loss rate to calculate the abnormality determination threshold LOSS_TH (=LOSS_SP+Nσ) (S12).

Then, the network analysis device determines that the network is abnormal (S14) when the measured value LOSS_M of the current packet loss rate is over the abnormality determination threshold LOSS_TH (=LOSS_SP+ Nσ) (YES in S13) or determines that the network is normal (S15) when the measured value LOSS_M is not over the abnormality determination threshold LOSS_TH (NO in S13).

The abnormality determination for the network based on the JIT analysis described above is performed based on data obtained by aggregating, in each time period, the network analysis data resulting from analysis of packet data in each of connections included in the plurality of connection groups between the plurality of communication node groups and the service system SYS.

Accordingly, the current aggregated data is obtained by aggregating, in each unit time, the network analysis data sets for the individual connections included in the plurality of connection groups. For example, the explanatory variables such as the number of packets and the number of bytes correspond to total values in the individual connections included in the plurality of connection groups, while the objective variable (determination target value) such as the packet loss rate, the return travel time (RTT), or the server processing time corresponds to an average value in the individual connections.

According to the second network abnormality determination method in FIG. 3, the abnormality determination threshold LOSS_TH is set using the estimated value LOSS_SP and the normal range Nσ each reflecting a tendency of the packet loss rate with respect to the communication amount at normal times included in the previous training data. Consequently, in a first case where the communication amount increases to increase the packet loss rate LOSS_M such as during a system operation period as observed at a time T3 in FIG. 3, the estimated value LOSS_SP of the packet loss rate and the threshold LOSS_TH increases, and therefore it is determined that the network is normal.

In a second case where the communication amount decreases to reduce the number of packets and significantly increase the measured value LOSS_M of the current packet loss rate such as during a system non-operation period as observed at the time T2, the normal range Na based on the dispersion of the packet loss rate in the training data increases to also increase the abnormality determination threshold LOSS_TH, and therefore it is determined that the network is normal. This is because, when the number of packets decreases due to the decreased communication amount and the number of lost packets vertically varies in any of the connections, the dispersion of the packet loss rate obtained by dividing the number of lost packets by the number of packets increases to enlarge the normal range Nσ.

In a third case where the measured value LOSS_M of the current packet loss rate significantly increases though the estimated value LOSS_SP of the packet loss rate based on the previous tendency is not increased as observed at the time T1, the current measured value LOSS_M exceeds the abnormality determination threshold LOSS_TH, and therefore it is determined that the network is abnormal.

Thus, the network analysis device performs the abnormality determination for the network using the data obtained by aggregating the network analysis data for the plurality of connection groups, and various states included in the previous network analysis data are reflected on the local model and the local linear model by the JIT analysis. Accordingly, it is possible to perform appropriate abnormality determination corresponding to a network situation.

Alarm and Feedback Responding to Alarm

Figure 7:
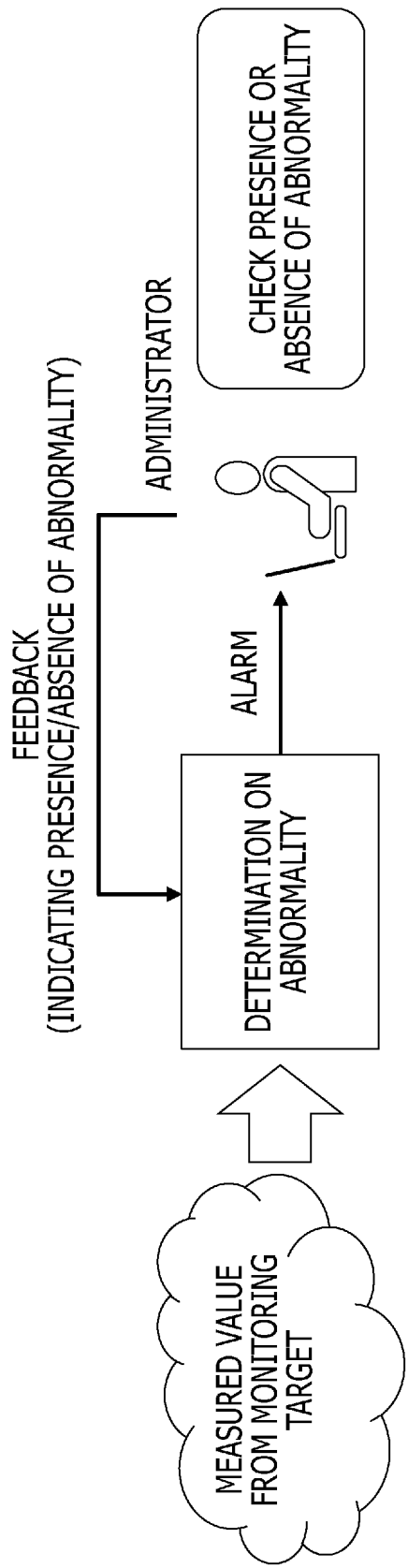
FIG. 7 is a diagram illustrating generation of an alarm and a feedback responding to the alarm.

FIG. 7 is a diagram illustrating generation of an alarm and a feedback responding to the alarm. In the network abnormality determination method, when determining an abnormality in the network, the network analysis device NW_AN_2 transmits an alarm with a feedback FB to the administrator of the network system. In response to the alarm with the feedback FB, the administrator checks the presence or absence of an abnormality in the network and returns either of a feedback indicating the presence of an abnormality or a feedback indicating the absence of an abnormality to the network analysis device.

Then, when receiving the feedback indicating the absence of an abnormality, the network analysis device determines that the abnormality determination based on which the alarm was generated is erroneous determination according to the criteria of the administrator, and increases the factor value N of the normal range Nσ. Meanwhile, when receiving the feedback indicating the presence of an abnormality, the network analysis device determines that the abnormality determination based on which the alarm was generated is correct determination according to the criteria of the administrator, and does not increase the factor N of the normal range Nσ.

By thus checking the determination criteria of the administrator who is a user of the abnormality determination for the network, the network analysis device optimizes the size of the normal range Nσ.

Network Analyzation Device, Network Analysis Device, and Analysis Program

Next, a description will be given of an outline of the network analyzation device, the network analysis device, and processing according to an analysis program therein.

Figure 8:
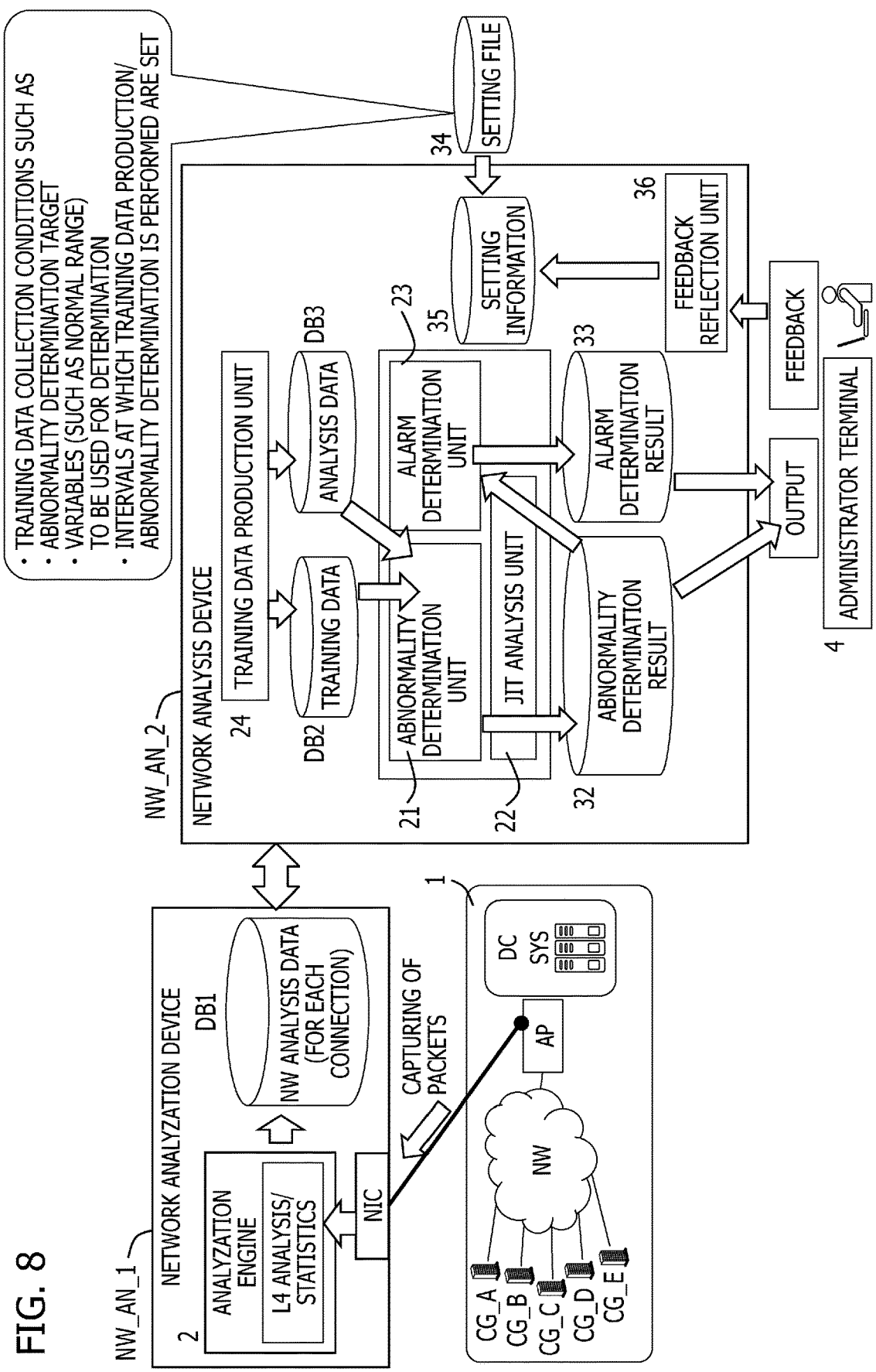
FIG. 8 is a diagram illustrating an example of configurations of the network analyzation device and the network analysis device.

FIG. 8 is a diagram illustrating an example of configurations of the network analyzation device and the network analysis device. FIG. 8 illustrates the network analyzation device NW_AN_1 and the network analysis device NW_AN_2. In the network analyzation device NW_AN_1, an analyzation engine 2 collects packets captured at the access points AP set on the communication paths between the plurality of communication node groups (corresponding to, e.g., the plurality of connection groups CG_A to CG_E) and the service system SYS in the data center in the communication network 1. Examples of packets to be collected include communication data between the communication node groups (not illustrated) and the service system SYS that are transmitted in the individual connections of each of the plurality of connection groups and the like. Then, the analyzation engine 2 analyzes the collected packets, takes statistics on the packets, and stores, e.g., the network analysis data for each of the connections in a database DB1.

The network analysis device NVV_AN_2 analyzes the state of the communication network 1 based on the network analysis data in the database DB1, and performs abnormality determination. A processor (not illustrated) of the network analyzation device executes the network analysis program described later to configure a training data production unit 24, a network abnormality determination unit 21, a JIT analysis unit 22, an alarm determination unit 23, and a feedback reflection unit 36. The network analysis device also reads setting information 35 from an external setting file 34, and each of the units 21 to 24 and 36 described above executes each processing based on the setting information.

For example, the setting file 34 includes the setting information such as training data extraction conditions, an abnormality determination target serving as an index (such as the packet loss rate or the server processing time) for abnormality determination, variables (such as the normal range Nσ) used for abnormality determination, and intervals at which training data production or abnormality determination is performed.

The network analysis device is communicatively connected to a terminal 4 of the administrator of the communication network 1 to output, to the administrator terminal device 4, an abnormality determination result 32 generated by the abnormality determination unit 21 and an alarm determination result 33 generated by the alarm determination unit 23. In addition, the network analysis device receives the feedback responding to the alarm from the administrator terminal device 4, and the feedback reflection unit 36 adjusts, based on the feedback, the factor value N for the normal range Nσ, which is one of the variables included in the setting information 35 and used for the abnormality determination.

Figure 9:
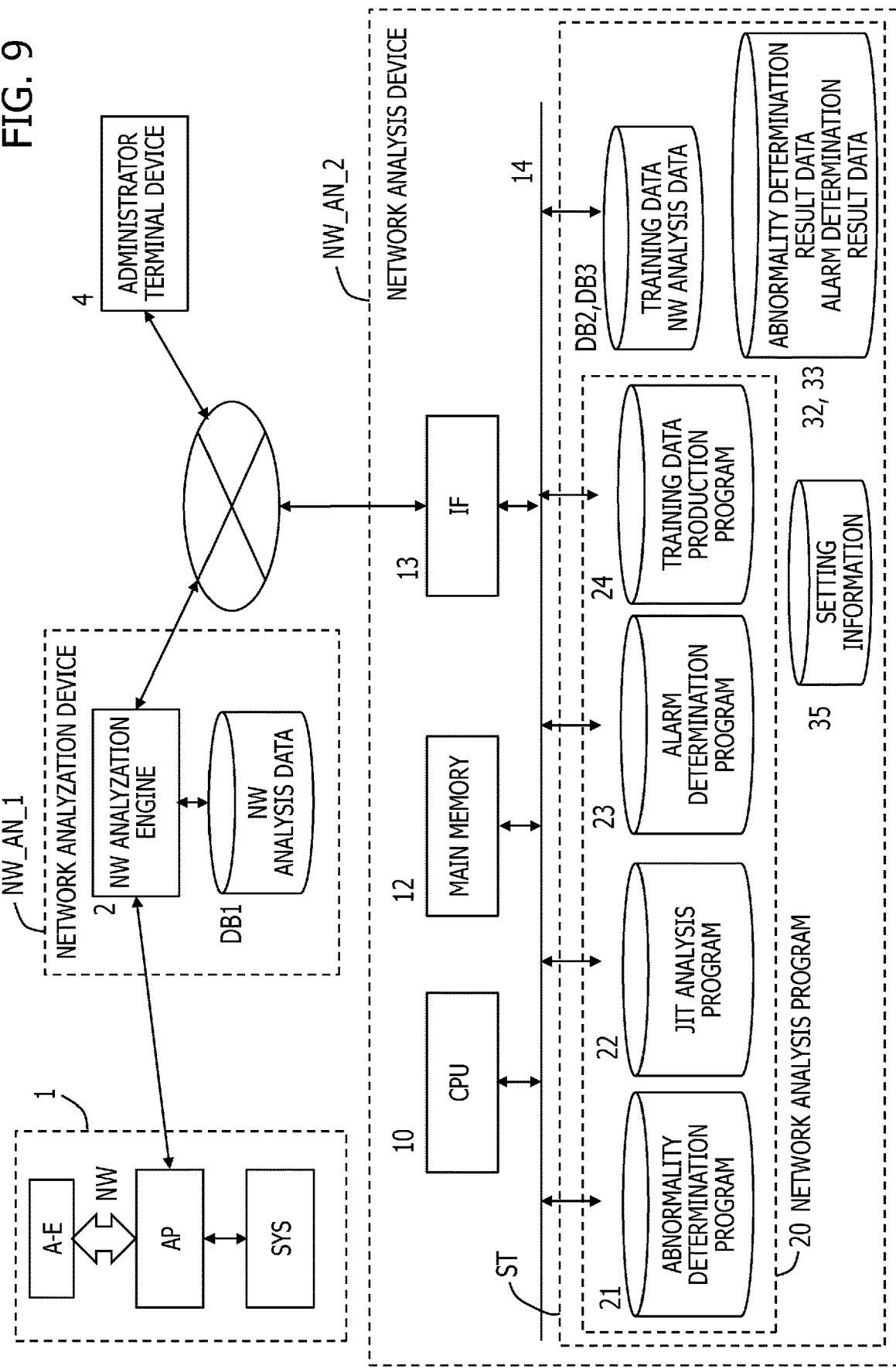
FIG. 9 is a diagram illustrating an example of the configuration of the network analysis device.

FIG. 9 is a diagram illustrating an example of the configuration of the network analysis device. FIG. 9 illustrates not only the network analysis device NW_AN_2, but also the communication network 1, the network analyzation device NW_AN_1, and the administrator terminal device 4. The configurations of the communication network 1 and the network analyzation device NW_AN_1 are equal to those illustrated in FIG. 8.

Meanwhile, in FIG. 9, the network analysis device NW_AN_2 is a computer such as a network analysis server. The network analysis device includes a processor 10, a main memory 12, a network interface 13, and an auxiliary storage device ST, which is a large-capacity storage.

In the auxiliary storage device ST, a network analysis program 20 including an abnormality determination program 21, a JIT analysis program 22, an alarm Determination program 23, and a training data production program 24 is stored. Additionally, in the auxiliary storage device ST, training data DB2, DB3, abnormality determination result data 32, alarm determination result data 33, and the setting information 35 read from the setting file 34 are stored.

The processor 10 of the network analysis device executes the network analysis program 20 read from the auxiliary storage device ST and deployed in the main memory 12. Thus, the processor 10 analyzes the state of the communication network, and performs abnormality determination for the network.

A description will be given of the outline of the processing performed by the network analyzation device NW_AN_1 and the network analysis device NW_AN_2. Then, erroneous abnormality determination in network analysis will be described, and processing in the network analysis in the present embodiment which solves the problem of the erroneous abnormality determination will be described.

First, the network analyzation device NW_AN_1 captures packets at various access points (each including a router, a switch, or the like) on the communication paths or the like, analyzes the captured packets, and stores the network analysis data DB1 in the storage.

For example, the network analysis data is analysis data in a level 4 communication layer, which is analysis data for each of the connections in each time period. The analysis data for each of the connections includes source/destination IP addresses, a protocol number, source/destination port numbers, the number of source-to-destination packets, the number of destination-to-source packets, the number of bytes of data, the number of lost packets, the return travel time (RTT), the server processing time, and the like. The numbers of packets and the number of bytes included in the network analysis data for each of the connections is data related to the communication amount, while the number of lost packets, the RTT, and the server processing time are determination target items serving as the indices for abnormality determination for the network. By dividing the numbers of lost packets by the numbers of packets, packet loss rates are calculated.

Figure 10:
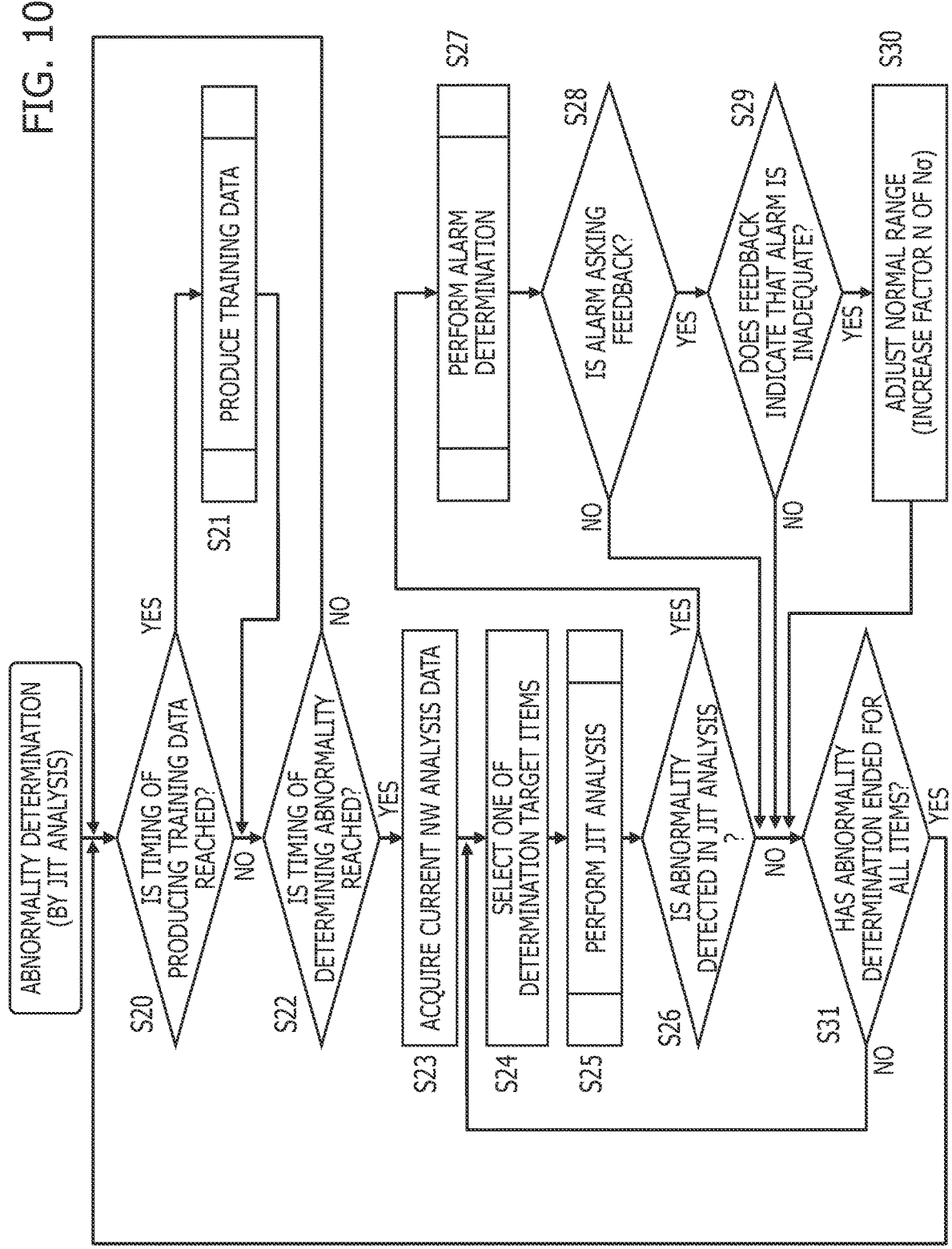
FIG. 10 is a chart illustrating a flow chart of the abnormality determination program included in the network analysis program in the network analysis device NW_AN_2.

FIG. 10 is a chart illustrating a flow chart of the abnormality determination program included in the network analysis program in the network analysis device NW_AN_2. Processing step numbers S21, S23, S25, S27, and the like illustrated in FIG. 10 are also illustrated in FIG. 8.

The processor of the network analysis device executes the network analysis program to perform the following processing steps. Specifically, when timing of producing the training data is reached, e.g., every day (YES in S20), the processor produces the training data from the network analysis data corresponding to previous three weeks (S21).

Figure 11:
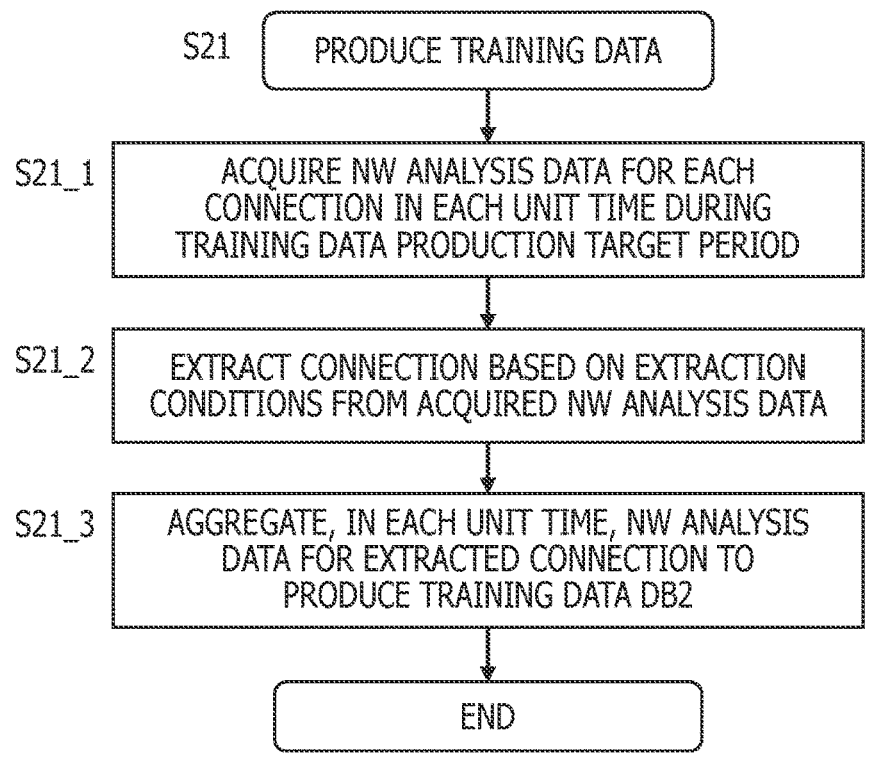
FIG. 11 is a chart illustrating a flow chart of e processing according to the training data production program.
Figure 25:
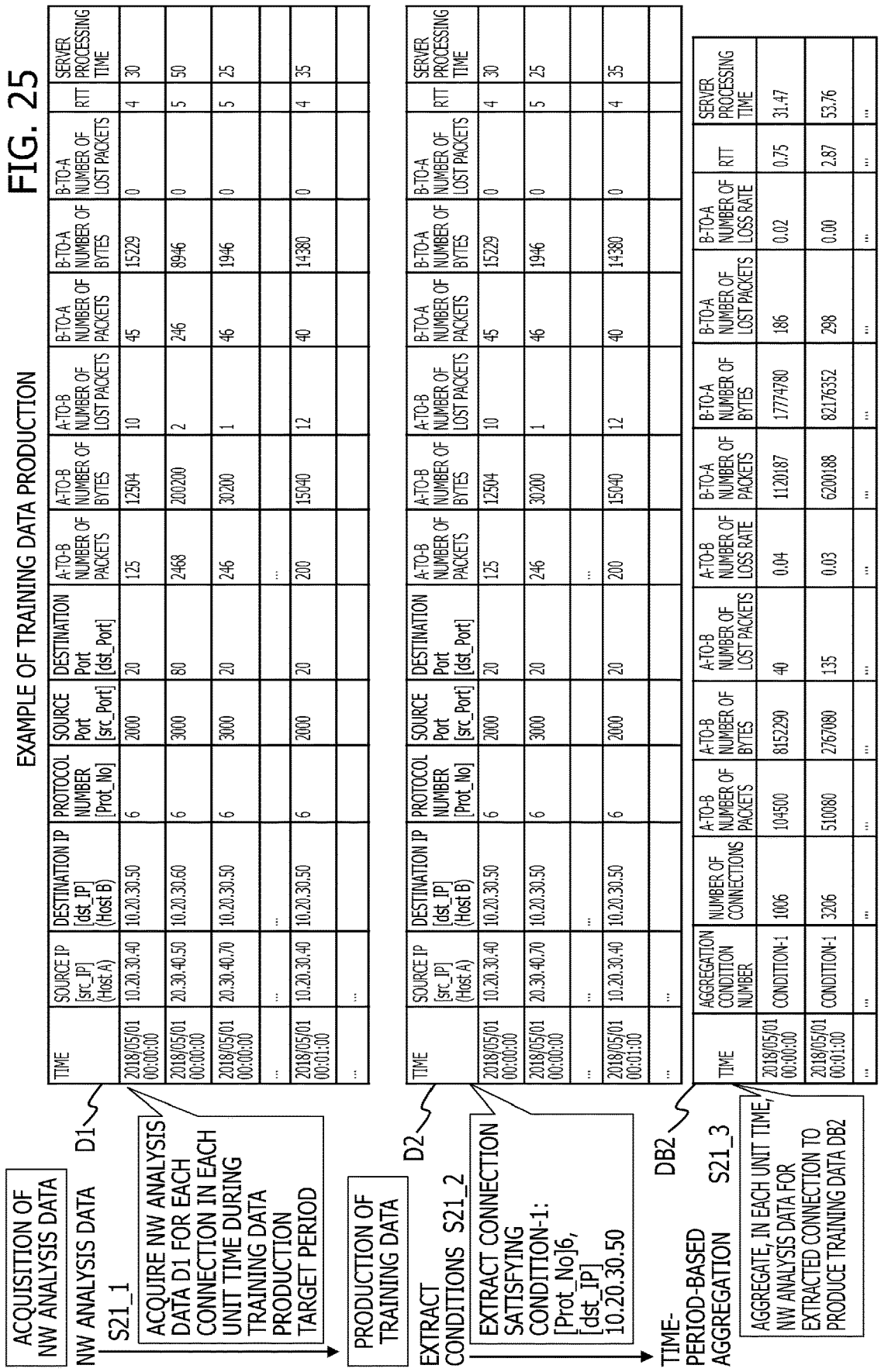
FIG. 25 illustrates an example of production of the training data.

FIG. 11 is a chart illustrating a flow chart of the processing according to the training data production program. FIG. 25 illustrates an example of production of the training data. The processor extracts and acquires, from the network analysis data DB1 in the storage of the network analyzation device, the network analysis data D1 for each of the connections in each time period (e.g., at each minute) during a training data production target period (e.g., three weeks) (S21_1).

FIG. 25 illustrates an example of acquired network analysis data D1 for each of the connections in each time period in the three weeks (May 1-21, 2018). Details of the network analysis data are as described previously.

Then, the processor extracts, from the network analysis data D1 acquired for each of the connections in each time period, connections based on the various extraction conditions in the setting information 35 (S21_2). As a result, in FIG. 25, network analysis data D2 extracted for each of the connections in each time period based on Extraction Condition-1 (Protocol Number [Prot_No] "6" and Destination IP[dst_IP] "10.20.30.50") is illustrated. The extraction conditions define a network of the abnormality determination target and a communication protocol of the determination target.

FIG. 24 is a diagram illustrating an example of setting of the data extraction conditions and an example of setting of the determination target items. In FIG. 24, an example of the extraction conditions mentioned above is illustrated, and Condition-1 corresponds to Extraction Condition-1 described above. In FIG. 24, a destination IP represents an IP address of the access point of the service system SYS in the communication network 1 in FIG. 1. The protocol number is an identification number of a protocol in a layer above the IP layer. The protocol number "6" represents a TCP protocol.

For example, when described in the example of the communication network 1 in FIG. 1, Condition-1 is a condition for extracting a connection addressed to the service system SYS in the data center DC. In the communication network 1 in FIG. 1, the connections established between communication nodes (terminals) belonging to respective sub-networks at the bases A to E and the service system SYS in the data center DC are extracted under conditions included in Condition-1.

In Condition-2, the protocol number is "6" and the source sub-network address is "20.30.0.0/16". For instance, in the example of Condition-2, a connection established using, as a source, a sub-network address of a base in the communication network 1 in FIG. 1 is extracted.

Examples of the various extraction conditions under which the connections are to be extracted are as follows.

EXAMPLE 1

Such a single destination IP address or subnetwork address as in Condition-1
 [Prot_No]6, [dst_IP] 10.20.30.50

EXAMPLE 2

Such a single source sub-network address or P address as in Condition-2
 [Prot_No]6, [src_IP] 20.30.0.0/16

EXAMPLE 3

A mode in which a plurality of destination (or source) IP addresses are combined
 [Prot_No]6, [dst_IP] 10.20.30.50
 [Prot_No]6, [dst_IP] 10.20.30.60

EXAMPLE 4

A mode in which such a single destination or source sub-network as in Condition-2 is specified
 [Prot_No]6, [src_IP] 20.30.0.0/16

EXAMPLE 5

A mode in which a plurality of destination or source sub-networks are specified
 [Prot_No]6, [src_IP] 20.30.0.0/16
 [Prot_No]6, [src_IP] 20.40.0.0/16
 [Prot_No]6, [src_IP] 20.50.10.0/24

The determination target items in FIG. 24 will be described later.

Then, the processor aggregates, in each unit time, the network analysis data D2 extracted for each of the connections in each unit time to produce training data DB2 (S21_3). The training data is stored as the training data DB2 illustrated in FIG. 8 in the storage in the network analysis device.

FIG. 25 illustrates an example of the training data DB2 resulting from the unit-time-based aggregation. In the example of the training data DB2 illustrated in FIG. 25, the network analysis data for each of the connections included in the plurality of connection groups in each unit time (1 minute) in the previous three weeks is aggregated. According to the example, the number of connections corresponds to the total number of the connections in the plurality of connection groups in the unit time. The number of packets, the number of bytes, the number of lost packets also correspond to the total number of packets, the total number of bytes, the total number of lost packets in the plurality of connection groups in each unit time. The packet loss rate is a value obtained by dividing the total number of lost packets in the plurality of connection groups in each unit time by the total number of packets in the plurality of connection groups in each unit time (i.e., an average loss rate in all the connections). The RTT and the server processing time are an average RTT and an average server time in all the connections included the plurality of connection groups.

Returning to FIG. 10, the processor repeats the training data production processing step S21 described above until the timing of determining network abnormality is reached (YES in S22). When the timing of determining network abnormality is reached (YES in S22), the processor acquires the current network analysis data (S23).

Figure 26:
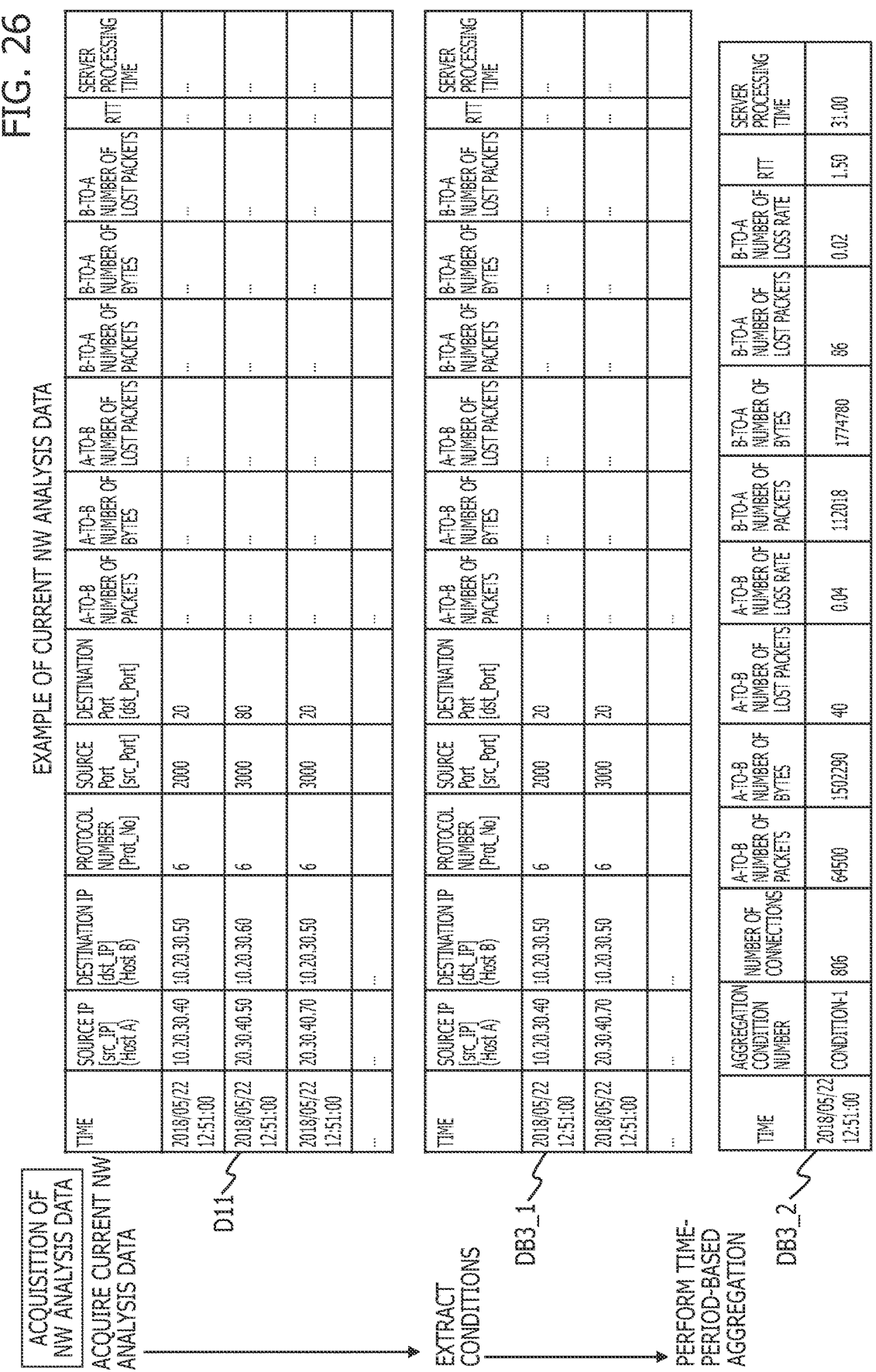
FIG. 26 is a chart illustrating an example of acquisition of the current network analysis data.

FIG. 26 is a chart illustrating an example of acquisition of the current network analysis data. The processing of acquiring the current network analysis data at a current time corresponding to the timing of abnormality determination is substantially the same as the processing of producing the training data illustrated in each of FIGS. 11 and 25 except that the acquisition times are different (whether in the previous three weeks or at the current time). In the processing of acquiring the current network analysis data, the processor acquires, as the current network analysis data, network analysis data D11 for each of the connections at the current time (at 12:51:00 on 2018/05/22) from the network analysis data DB1 in the storage of the network analyzation device NW_AN_1, as illustrated in FIG. 26.

Then, the processor extracts network analysis data DB3_1 for each of the connections from the acquired current network analysis data D11 for each of the connections based on the extraction conditions (Condition-1: Protocol Number 6, Destination IP Address: 10:20:30:50), and stores the extracted network analysis data DB3_1 in the storage. As illustrated in FIG. 26, the extracted network analysis data DB3_1 includes the analysis data for all the current connections in the plurality of connection groups. For the analysis data DB3_1 for all the current connections, a histogram described later is generated.

Then, the processor aggregates the extracted analysis data DB3_1 for all the current connections in the plurality of connection groups to generate aggregated network analysis data DB3_2, and stores the aggregated network analysis data DB3_2 in the storage, as illustrated in FIG. 26. The explanatory variables (the number of packets and the number of bytes) in the current aggregated network analysis data DB3_2 are used as explanatory variables (the number of packets and the number of bytes) for the query in the JIT analysis.

Returning to FIG. 10, the processor selects one of the determination target items in the setting information 35 (S24). FIG. 24 illustrates an example of the determination target items. The determination target items are indices for abnormality determination for the network. In the example illustrated in FIG. 24, the server processing time, the packet loss rate, the RTT, and the like are included in the determination target items. The packet loss rate, the server processing time, and the RU are indices of the network quality.

Then, the processor performs the JIT analysis (S25). The outline of the JIT analysis method is illustrated in FIGS. 3 to 5. A description is given herein of the JIT analysis performed based on the training data DB2 corresponding to the previous three weeks illustrated in FIG. 25, on the network analysis data DB3_1 for each of the current connections illustrated in FIG. 26, and on the aggregated network analysis data (aggregated data) DB3_2 of the network analysis data DB3_1.

Figure 27:
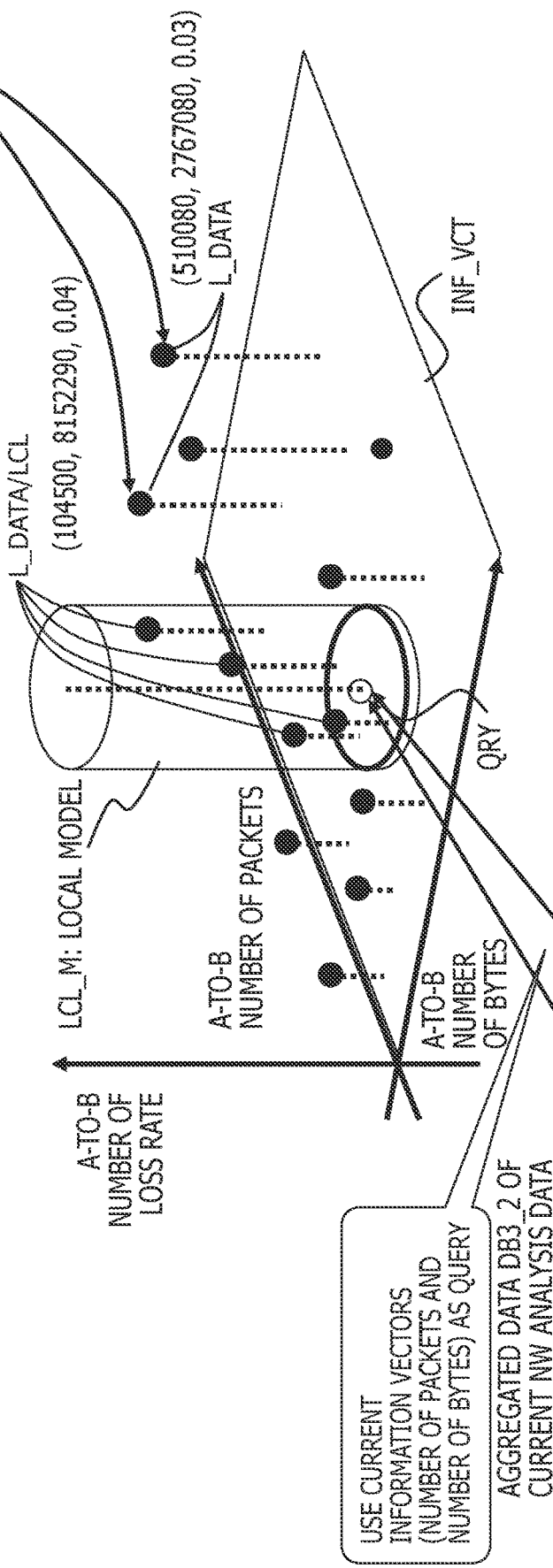
FIG. 27 is a chart illustrating a specific example of the JIT analysis based on the training data DB2 corresponding to the previous three weeks and on the current aggregated network analysis data (aggregated data) DB3_2.

FIG. 4 is a chart illustrating a flow chart of the JIT analysis. FIG. 27 is a chart illustrating a specific example of the JIT analysis based on the training data DB2 corresponding to the previous three weeks and on the current aggregated network analysis data (aggregated data) DB3_2.

In the JIT analysis, the processor extracts, from the previous training data DB2, the training data L_DATA/LCL having explanatory variable vectors in the vicinity of explanatory variable vectors in the aggregated data DB3_2 of the current network analysis data, and uses the training data L_DATA/LCL as the local model LCL_M (S10 in FIG. 4). FIG. 27 illustrates the training data DB2 in the three weeks illustrated in FIG. 25, the aggregated data DB3_2 of the current network analysis data, and a vector space equivalent to that in FIG. 5 between the training data DB2 and the aggregated data DB3_2. The training data L_DATA included in the previous training data DB2 is plotted in the vector space INF_VCT. The training data L_DATA is obtained by aggregating the analysis data for each of the connections in the plurality of connection groups in each time period in the three weeks.

Then, the processor uses vectors having, as elements, the number of packets and the number of bytes serving as the explanatory variables in the aggregated data DB3_2 of the current network analysis data as the query QRY, extracts the training data L_DATA/LCL including vectors within a given distance from the query, and uses the training data L_DATA/LCL as the local model LCL_M (S10 in FIG. 4).

As described above, since the previous training model DB2 is the aggregated data of the network analysis data for each of the connections in the plurality of connection groups, the aggregated data DB3_2 of the current network analysis data for each of the connections in the plurality of connection groups is used for the query QRY for extracting the training data L_DATA/LCL for the local model LCL_M.

Then, as illustrated in FIG. 4, the processor calculates the local linear model based on the vectors (the number of packets, the number of bytes, and the packet loss rate) in the plurality of training data sets L_DATA/LCL included in the local model LCL_M, and estimates the objective variable (packet loss rate) for the explanatory variables (the number of packets and the number of bytes) of the vectors in the current aggregated data based on the local linear model LCL_L_M shown in FIG. 6 (S11 in FIG. 4).

Then, the processor adds, to the estimated value LOSS_SP of the packet loss rate, the normal range No obtained by multiplying the standard deviation o indicating the dispersion of the packet loss rate in the training data of the local model by the factor N to thus calculate the abnormality determination threshold LOSS_TH (S12 in FIG. 4). In addition, the processor determines whether or not a measured value of the packet loss rate in the current aggregated data is over the abnormality determination threshold LOSS_TH (S13 in FIG. 4). When the measured value of the packet loss rate is over the abnormality determination threshold LOSS_TH, the processor determines that the network is currently in an abnormal state (S14 in FIG. 4). When the measured value of the packet loss rate is equal to or smaller than the abnormality determination threshold LOSS_TH, the processor determines that the network is currently in a normal state (S15 in FIG. 4). The measured value of the packet loss rate in the current aggregated data corresponds to a value of the packet loss rate in the aggregated network analysis data DB3,_2 in FIG. 26, which is an average value of the respective packet loss rates in the plurality of connections in the plurality of connection groups in the conditionally extracted network analysis data DB3_1.

Returning to FIG. 10, when an abnormality is detected in the JIT analysis (YES in S26), the processor performs the alarm determination processing step S27. When an alarm asking feedback is generated (YES in S28) and a feedback from the administrator indicates that the alarm is unneeded (inadequate) (YES in S29), the processor increases the factor value N to adjust the normal range No to a larger size (S30). When an alarm asking feedback is not generated (NO in S28) or when there is no feedback indicating that the alarm is unneeded (inadequate) (NO in S29), the processor does not adjust the normal range. The processor selects the next determination target item in FIG. 24 and performs the same processing until abnormality determination for all the determination target items in FIG. 24 is ended (YES in S31).

Figure 12:
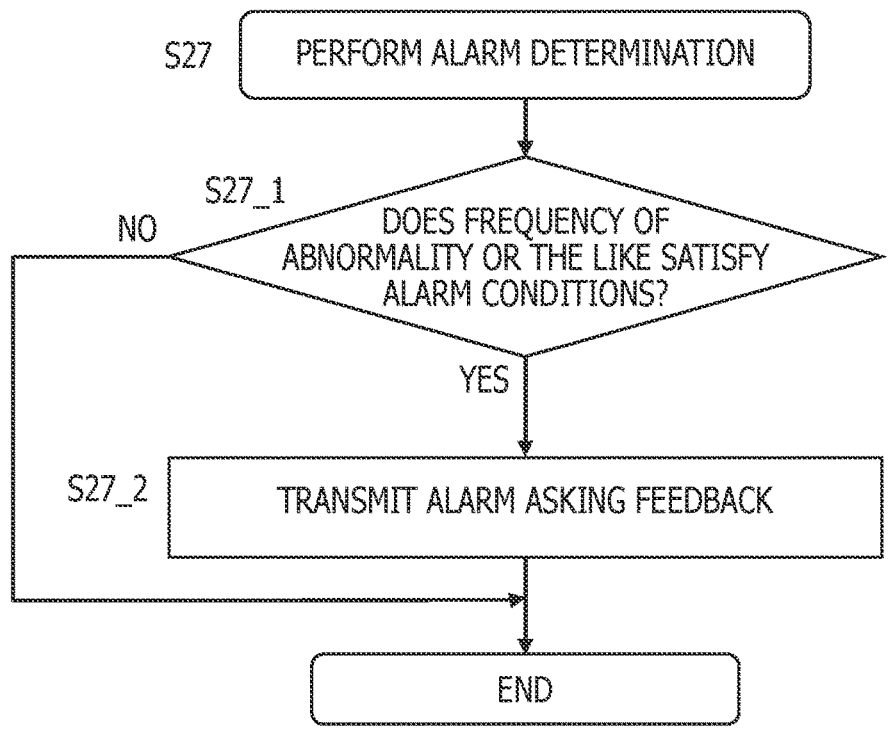
FIG. 12 is a chart illustrating a flow chart of the processing according to the alarm determination program.

FIG. 12 is a chart illustrating a flow chart of the processing according to the alarm determination program. The processor executes the alarm determination program to transmit an alarm asking feedback (S27_2) when the frequency of abnormality determination or the like satisfies alarm conditions (YES in S27_1). When the frequency of abnormality determination or the like does not satisfy the alarm conditions (NO in S27_1), the processor does not transmit the alarm asking feedback.

[Example of Network Abnormality Determination and Erroneous Determination Based on JIT Analysis]

Figure 13:
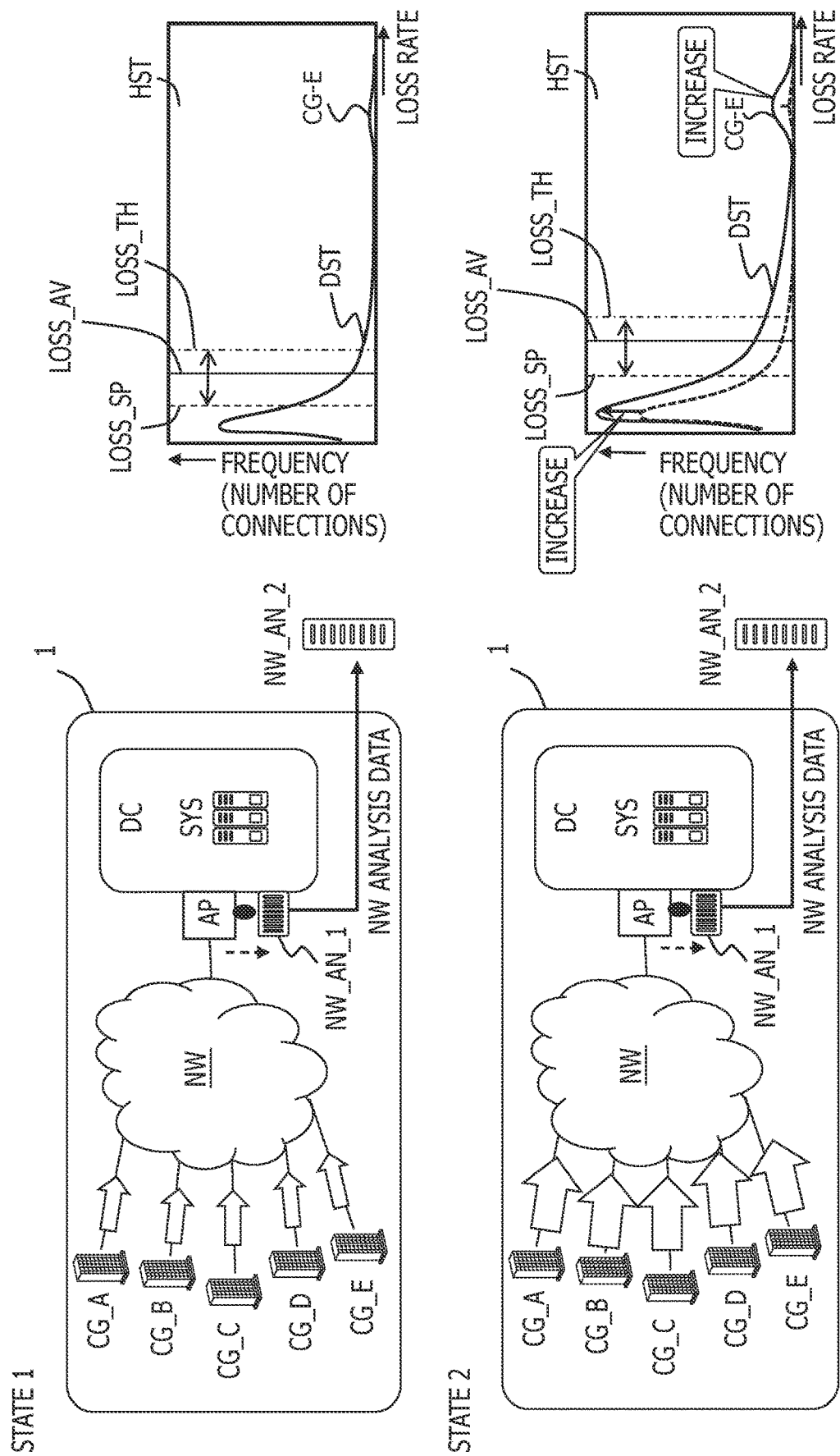
FIG. 13 is a chart illustrating a distribution (histogram) of a packet loss rate in each of the connections, which is generated for each of states.
Figure 14:
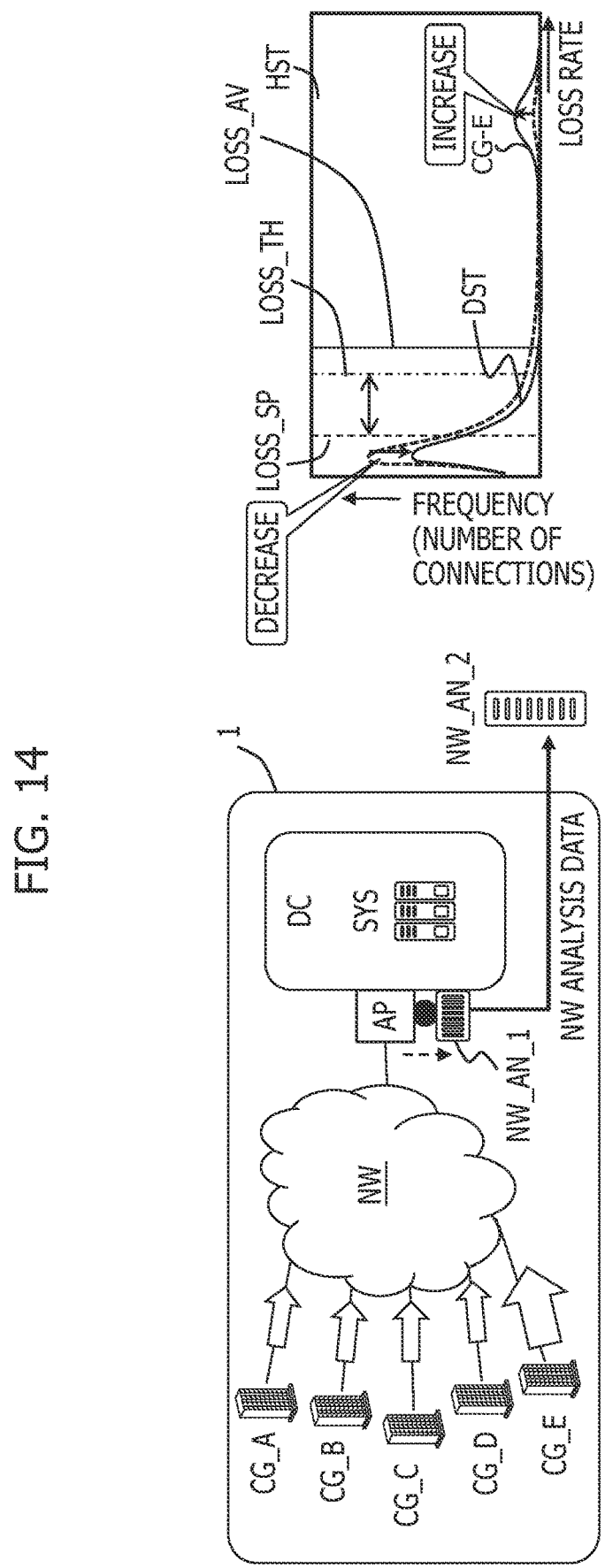
FIG. 14 is a chart illustrating an example of the distribution (histogram) of the loss rate in each of the connections when network abnormality is erroneously determined based on the JIT analysis.

FIG. 13 is a chart illustrating a distribution (histogram) of a packet loss rate in each of the connections, which is generated for each of states. FIG. 14 is a chart illustrating an example of the distribution (histogram) of the packet loss rate in each of the connections when network abnormality is erroneously determined based on the in analysis.

In FIG. 13, State 1 represents an example in which a ratio among respective communication amounts in the plurality of connection groups CG_A to CG_E is that in a normal state and the respective communication amounts in the plurality of connection groups CG_A to CG_E are also those in the normal state. Widths of arrows illustrated correspondingly to the connection groups CG_A to CG_E illustrated in State 1 represent the communication amounts. State 2 is different from State 1 in that, while the ratio among the respective communication amounts in the plurality of connection groups CG_A to CG_E is that in the normal state, the respective communication amounts in the plurality of connection groups CG_A to CG_E have increased.

On a right side of the communication network 1, histograms HST are illustrated to represent distributions DST of the packet loss rates in all the connections in the current network analysis data DB3_1 in States 1 and 2. Each of bins along a horizontal axis of each of the histograms corresponds to the packet loss rate, while a height of each of the bins corresponds to the number of connections.

In each of the histograms HST, the estimated value LOSS_SP of the current packet loss rate calculated by the JIT analysis, the abnormality determination threshold LOSS_TH, and a measured value (average packet loss rate in all the connections) LOSS_AV of the average packet loss rate included in the current aggregated network analysis data DB3_2 are illustrated.

In the network abnormality determination processing step S13 in the MT analysis illustrated in FIG. 4, the processor determines whether or not the measured value LOSS_AV of the current average packet loss rate is over the abnormality determination threshold LOSS_TH calculated from the training data of the local model. By aggregating the analysis data for the connections in the plurality of connection groups CG_A to CG_E and performing determination, the processor is able to perform collective abnormality determination for the plurality of connection groups CG_A to CG_E.

In State 1, the measured value LOSS_AV of the current average packet loss rate in the plurality of connection groups is smaller than the abnormality determination threshold LOSS_TH, and therefore the processor determines that the network is normal. In the histogram HST, the packet loss rate in the connection groups CG_A to CG_D in a broad band is low, and a large number of connections are distributed in a region where the packet loss rate is low, while the packet loss rate in the connection group CG_E in a narrow band is high, and a small number of connections in the connection group CG_E are distributed in a region where the packet loss rate is high.

Meanwhile, in State 2, the communication amounts in all the connection groups have increased, and the measured value LOSS_AV of the current average packet loss rate is higher than in State 1. This is because, in general, when a communication amount increases, a packet loss rate increases. However, in the MT analysis, abnormality determination is made through a comparison of the measured value (average value) LOSS_AV to the abnormality determination threshold LOSS_TH obtained by adding up the estimated value LOSS_SP of the objective variable (packet loss rate) and the normal range Nσ based on the dispersion. In State 2, the communication amounts in the plurality of connection groups have increased, and consequently the estimated value LOSS_SP also increases, and the abnormality determination threshold LOSS_TH also increases. As a result, in State 2 also, the measured value LOSS_AV of the current average packet loss rate is smaller than the abnormality determination threshold LOSS 5H, and therefore it is determined that the network is normal.

In the histogram HST in State 2, the communication amounts in all the connection groups have increased, and consequently the number of connections has increased in each of the region where the packet loss rate is low and the region where the packet loss rate is high, as illustrated in the current distribution DST In State 3 illustrated in FIG. 14, the communication amounts in the connection groups CG_A to CG_D are equal to or smaller than those in State 1, while the communication amount in the connection group CG_E in the narrow band is larger than that in State 1. In other words, the ratio among the respective communication amounts in the connection groups CG_A to CG_E is different from that at normal times. Consequently, in State 3, the estimated value LOSS_SP of the packet loss rate based on the training data in the local model is equal to or slightly larger than that in State 1. This is because the frequency of occurrence of State 3 is low, and there is substantially no training data reflecting State 3 in DB2.

Meanwhile, since the ratio among the communication amounts in the connection groups is different from that at normal times, a proportion of the number of the connections having low packet loss rates in the connection groups CG_A to CG_D has decreased, and a portion of the number of the connections having high packet loss rates in the connection group CG_E has increased as illustrated in the current distribution DST, the measured value LOSS_AV of the average packet loss rate in the current aggregated data significantly increases. As a result, in State 3, LOSS_AV>LOSS_TH is satisfied, and the processor erroneously determines that the network is in the abnormal state.

As described above, in State 3, in the connection group CG_E in the narrow band, the communication amount has increased and the number of lost packets has increased, but the packet loss rate is not excessively high and therefore the connection group CG_E is not in the abnormal state. However, the communication amounts in the other connection groups CG_A to CG_D are small, the increase of the number of connections having the high packet loss rate in the connection group CG_E is conspicuous, and the measured value LOSS_AV of the average packet loss rate in the current aggregated data has significantly increased. As a result, it is erroneously determined that the connection group CG_E is in the abnormal state. It is not preferable in terms of operation/management of the communication network 1 to issue an alarm based on abnormality determination resulting from such erroneous determination. In addition, when an alarm with a feedback is issued based on the erroneous determination, the feedback indicates that there is no abnormality, and consequently the factor N of the normal range Nσ is adjusted to be larger. The adjustment of the factor N based on such erroneous determination is not preferable in the subsequent abnormality determination.

Note that, when the packet loss rate becomes higher than that at normal times in all of the connection groups CG_A to CG_E or the packet loss rate becomes higher than that at normal times in a part of or any one of the connection groups, it is possible to detect an abnormality using JIT analysis.

Characteristic Feature of Network Analysis Processing in Present Embodiment

Figure 15:
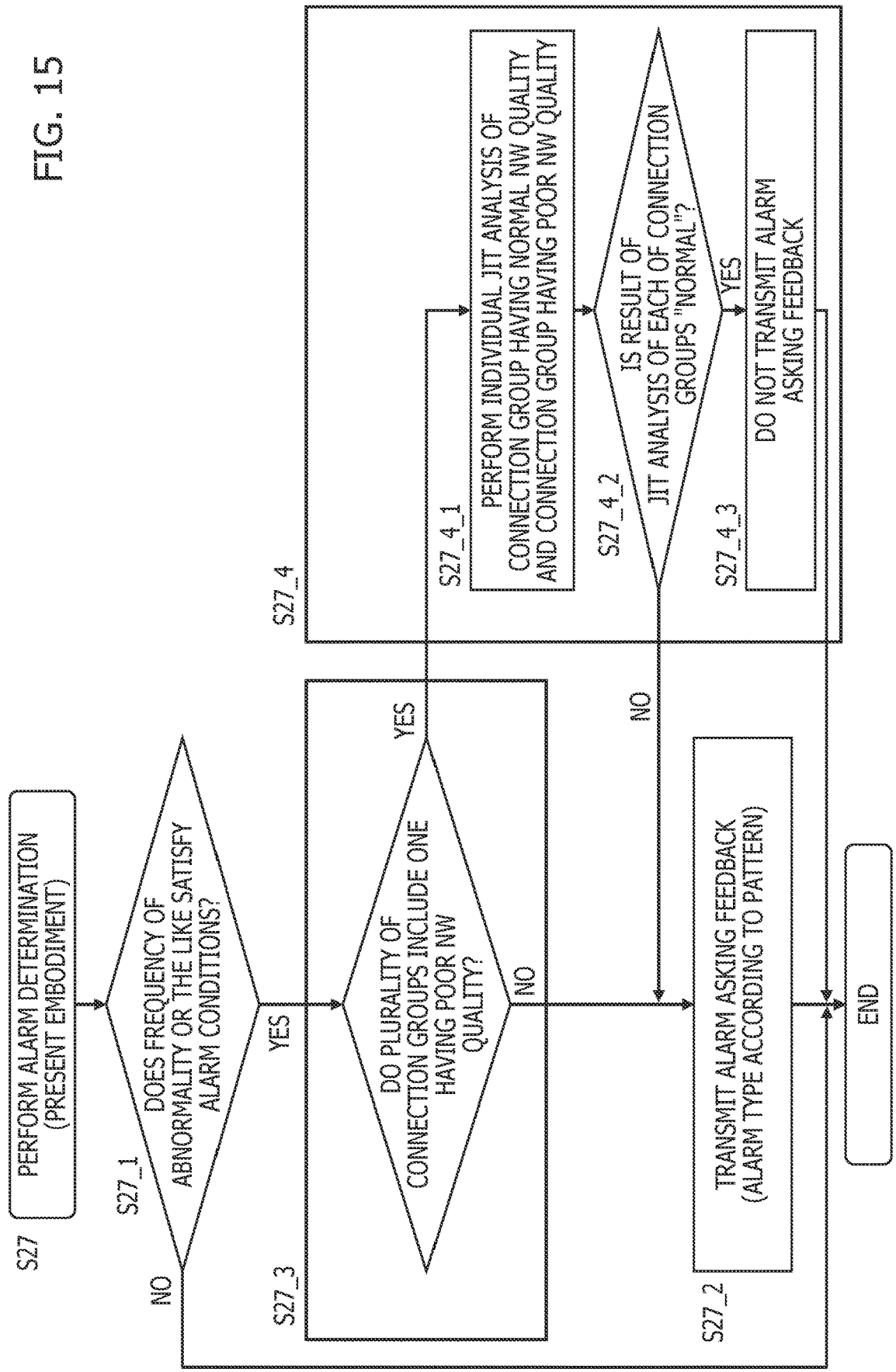
FIG. 15 is a chart illustrating a flow chart of the alarm determination program included in the network analysis program in the present embodiment.

FIG. 15 is a chart illustrating a flew chart of the alarm determination program included in the network analysis program in the present embodiment. The flow chart of FIG. 15 includes processing steps S27_3 and S27_4 for preventing erroneous determination in addition to the processing steps S27_1 and S272 in the flow chart of the alarm determination in FIG. 12.

In FIG. 15, in the processing step S273, the processor determines whether or not the plurality of connection groups include the connection group having a poor network quality during an abnormal determination period (period during which the network was determined to be abnormal). When a result of the determination is YES, in the processing 27_4, the processor performs individual (separate) JIT analysis of the connection groups each having a normal (not poor) network quality and the connection group (or groups each) having a poor network quality (referred to as the individual-analysis-target connection group) (S27_4_1). When both of the connection groups is determined to be normal (YES in S27_4_2), the processor performs the processing step of not transmitting an alarm asking feedback (S27_4_3). When there is no individual-analysis-target connection group having a poor network quality (NO in S27_3) or when any of the connection groups is determined to be abnormal by the JIT analysis (NO in S27_4_2), the processor transmits an alarm asking feedback (S27_2). Whether or not the alarm asking feedback is determined based on a type of the alarm.

FIG. 16 is a table illustrating the alarm asking feedback. In the communication network in State 3 illustrated in FIG. 14, the packet loss rate has deteriorated only in the individual-analysis-target connection group CG_E in the narrow band. When the alarm determination illustrated in FIG. 15 is performed in such State 3, the processor detects the connection group CG_E as the individual-analysis-target connection group having a poor network quality, while detecting the connection groups CG_A to CG_D as the connection groups each having a normal-level network quality, which are other than the individual analysis target. As a result, the processor performs individual (separate) JIT analysis of the individual-analysis-target connection group CG_E and the connection groups CG_A to CG_D other than the individual-analysis-target connection group CG_E.

FIG. 16 illustrates a combination of determination results when the individual-analysis-target connection group CG_E and the other connection groups CG_A to CG_D are subjected to individual (separate) JIT analysis in a case where all the connection groups are subjected to collective abnormality determination and any of the determination results indicates an abnormality. A leftmost column of the table illustrates the result when all the connection groups were subjected to collective abnormality determination, and all the determination results are "ABNORMAL". Meanwhile, second and third columns from a left side illustrate determination results when the connection groups CG_A to CG_D other than the individual-analysis-target connection group CG_E and the individual-analysis-target connection group CG_E were subjected to individual JIT analysis. A fourth column from the left side illustrates results of final determination. A fifth column from the left side illustrates the presence or absence of the alarm notification or the alarm type. A rightmost column illustrates an example of details of the adjustment of the factor N in response to the feedback to the alarm asking feedback.

In each of upper three rows of the table in which the connection groups CG_A to CG_D and the individual-analysis-target connection group CG_E were subjected to the individual (separate) JIT analysis and any of the connection groups was determined to be "ABNORMAL", the result of the final determination is "ABNORMAL". Accordingly, the processor transmits an alarm notification or transmits any of Alarm Types 1 to 3 (each of which is the alarm asking feedback). When a feedback indicates that "NO ALARM IS NEEDED (ADEQUATE)", the factor N is adjusted to be increased.

Meanwhile, in a lowermost row in which each of the connection groups CG_A to CG_D and the individual-analysis-target connection group CG_E was determined to be "NORMAL" in the JIT analysis of the connection groups CG_A to CG_D and the individual-analysis-target connection group CG_E, the result of the final determination is not "ABNORMAL". Accordingly, the processor does not transmit an alarm asking feedback or transmits Alarm Type 4. Since Alarm Type 4 is not the alarm asking feedback, the factor N is not adjusted.

Figure 17:
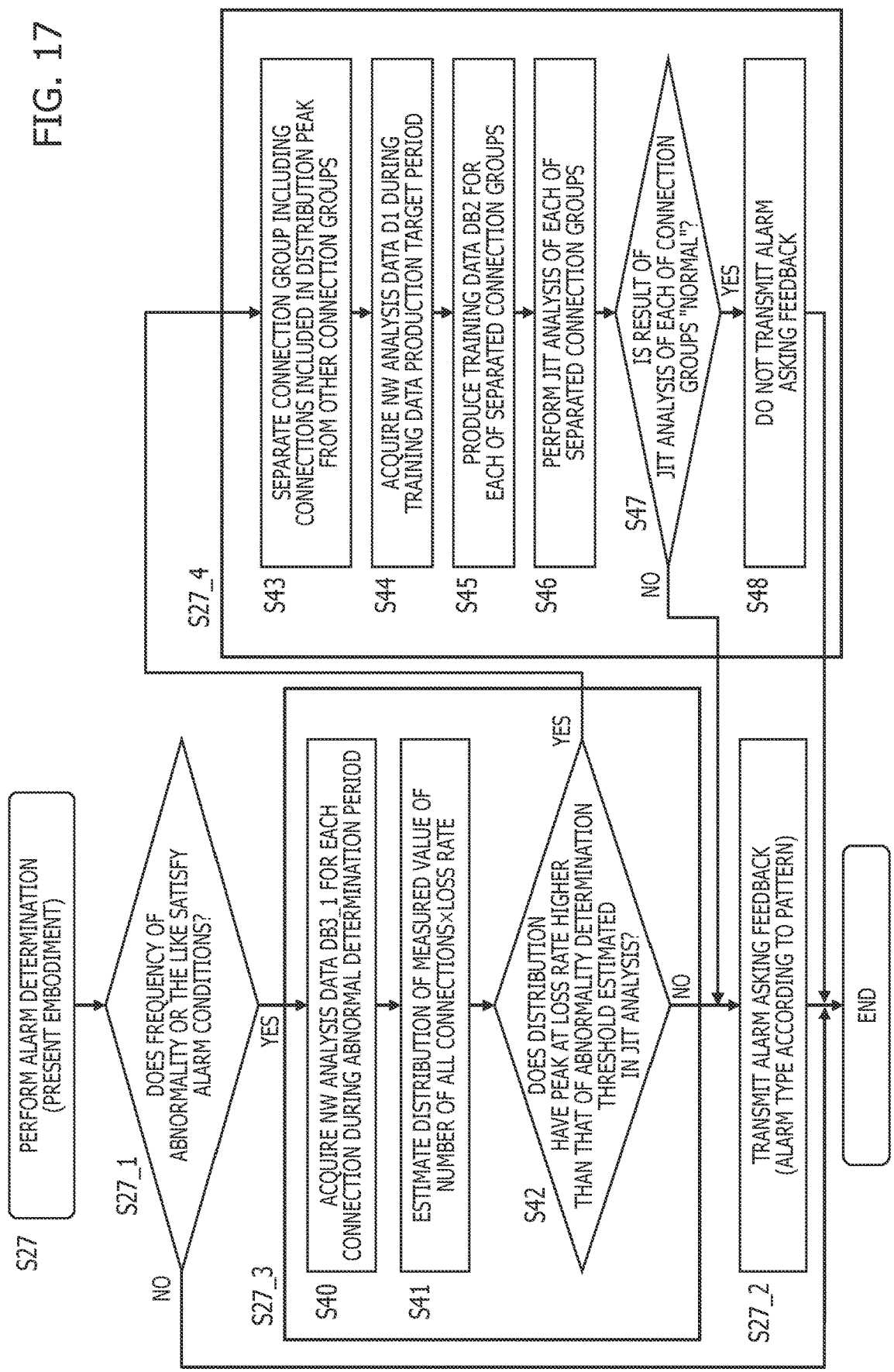
FIG. 17 is a chart illustrating a detailed flow chart of the alarm determination in the network analysis processing in the present embodiment.
Figure 18:
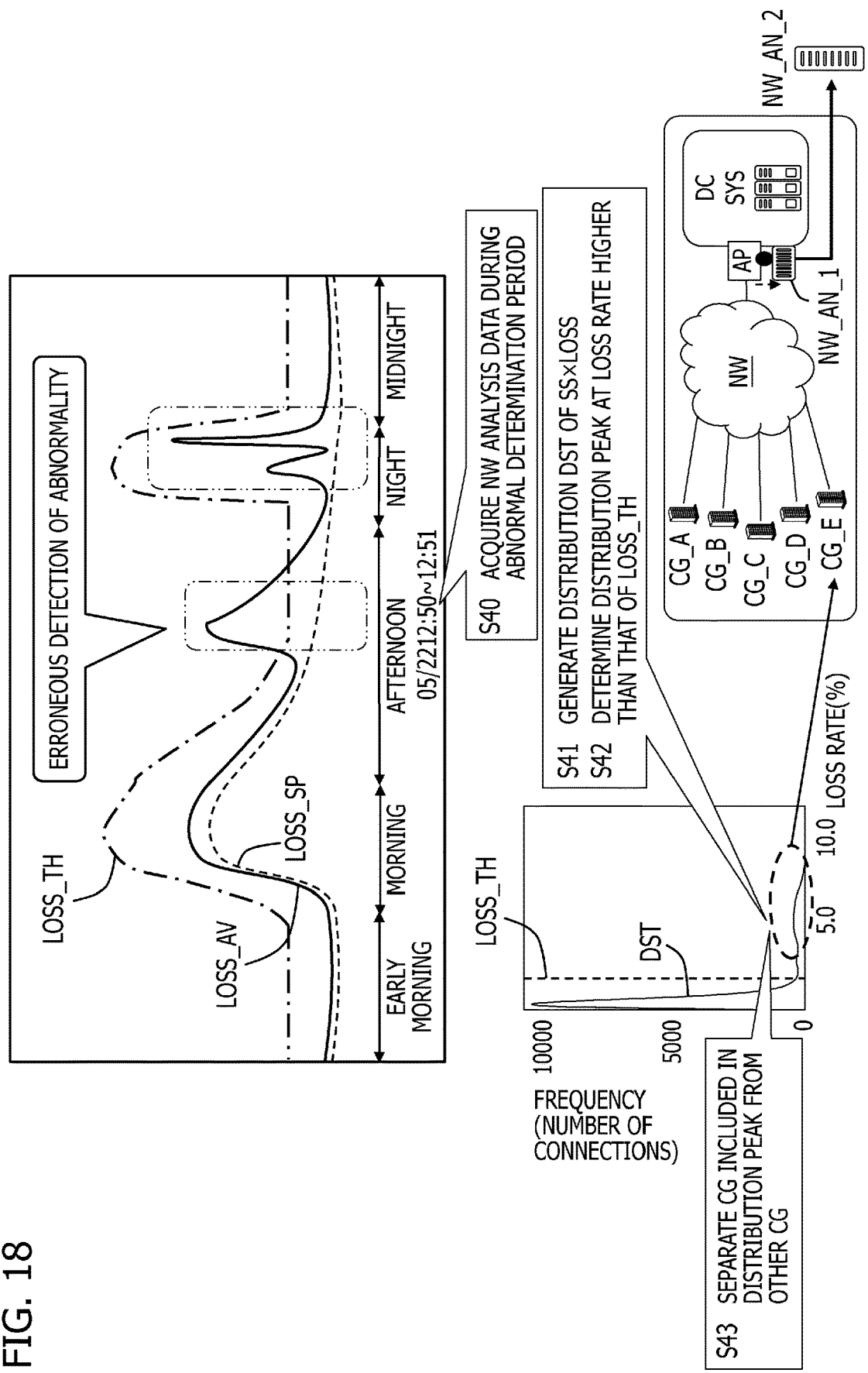
FIG. 18 is a chart illustrating processing in the detailed flow chart of the alarm determination in FIG. 17.

FIG. 17 is a chart illustrating a detailed flow chart of the alarm determination in the network analysis processing in the present embodiment. The flow chart of FIG. 17 illustrates details of the processing steps S27_3 and S27_4 in FIG. 15. FIG. 18 is a chart illustrating processing in the detailed flow chart of the alarm determination in FIG. 17. The processing steps S47 and S48 are the same as S27_4_2 and S27_43 in FIG. 15 respectively.

First, in the processing step S273 of determining whether or not the plurality of connection groups include the connection group having a poor network quality, the processor determines whether or not there is the individual-analysis-target connection group having a poor network quality based on the distribution of the packet loss rate in the network analysis data for each of the connections during the abnormal determination period.

To perform the determination, the processor acquires the network analysis data DB3_1 for each of the connections during the period when the network was determined to be abnormal, from the network analysis data DB1 in the network analyzation device (S40). Specifically, in the same manner as in FIG. 26, the processor acquires the network analysis data D11 for each of the connections during the abnormal determination period from the network analysis data DB1, and extracts the determination target connection from the network analysis data D11 through conditional extraction to acquire the network analysis data DB3_1 for each of the connections in each unit time.

FIG. 18 illustrates a graph representing a daily transition of the packet loss rate in a network equivalent to that in FIG. 3. According to the graph, during a period from 12:50 to 12:51 on May 22, the average value LOSS_AV of the packet loss rates in the connections aggregated in each unit time exceeded the abnormality determination threshold value LOSS_TH, and an abnormality in the network was determined. In other words, the period from 12:50 to 12:51 on May 22 corresponds to the abnormal determination period.

Then, the processor estimates, for the network analysis data DB3_1 for the connections during the abnormal determination period, the distribution DST (histogram) using, as a frequency, the measured value (SS LOSS) of Number of Connections SS×Packet Loss Rate LOSS with respect to the packet loss rate used as a class (bins) using a kernel function described later (S41). Then, the processor determines whether or not the estimated distribution DST has a distribution peak having a predetermined height (S42) at the packet loss rate higher than that of the abnormality determination threshold LOSS_TH estimated in the JIT analysis. When the distribution has such a distribution peak, the processor determines that the connection group including a large number of connections included in the distribution peak is the individual-analysis-target connection group having a poor network quality. FIG. 18 illustrates an example of the distribution DST of the packet loss rate. In FIG. 18, the distribution peak in the distribution SDT is indicated by the dotted ellipse.

FIG. 19 is a chart illustrating details of the processing steps S41 and S42 each described above. FIG. 19 illustrates the network analysis data DB3_1 for each of the connections during the abnormal determination period acquired in the processing step S41. As described above, the abnormal determination period is from 12:50 to 12:51 on May 22.

Then, a distribution using the number of connections SS as a frequency and a distribution using the measured value (SS×LOSS) of Number of Connections SS×Packet Loss Rate LOSS as a frequency for all the connections in the network analysis data DB3_1, generated in processing step S42, are illustrated in the histogram HST The two distributions SS and SS×LOSS are each generated based on the kernel function and will be specifically described later in detail.

In the histogram HST, the abnormality determination threshold LOSS_TH and a valley VAL and two peaks MT1 and MT2 of the measured value SS×LOSS of Number of Connections×Packet Loss Rate are illustrated. The peak MT1 at the lower packet loss rate corresponds to the peak of the connections in the connection groups CG_A to CG_D of a first type. The peak MT2 at the higher packet loss rate corresponds to the peak of the connections in the connection group CG_E of a second type.

The peak MT2 of SS×LOSS described above is the peak located at the packet loss rate higher than that of the abnormality determination threshold LOSS_TH In other words, the peak MT2 of SS×LOSS is also the peak located at the packet loss rate higher than that of the valley VAL of SS×LOSS. Accordingly, the processor determines whether or not the distribution peak MT2 located at the packet loss rate higher than that of the abnormality determination threshold LOSS_TH (or the valley VAL) is present in the histogram HST (S42).

As illustrated in FIGS. 18 and 19, the processor detects the distribution peak MT2 at a position of the packet loss rate higher than that of LOSS_TH based on the histogram HST of SS×LOSS (S42). As a result, the processor detects the presence of the individual-analysis-target connection group having a poor network quality (S27_3 in FIG. 17).

Returning to FIG. 17, in the processing step 27_4 where the connection groups each having a normal (not poor) network quality and the individual-analysis-target connection group having a poor network quality are subject to the individual JIT analysis, the processor detects the connection group including the connections included in the distribution peak MT2, and separates the individual-analysis-target connection group CG_E having a poor network quality from the other connection groups CG_A to CG_D (S43).

As illustrated in FIG. 19, the processor detects the connection group CG_E including a large number of connections included in the distribution peak MT2 based on the source IP addresses [src_IP] of the connections included in the distribution peak MT2 at the packet loss rate higher than the packet loss rate 4.2% at the valley VAL of SS LOSS.

Distribution Peak Detection Processing Step S42

Figure 20:
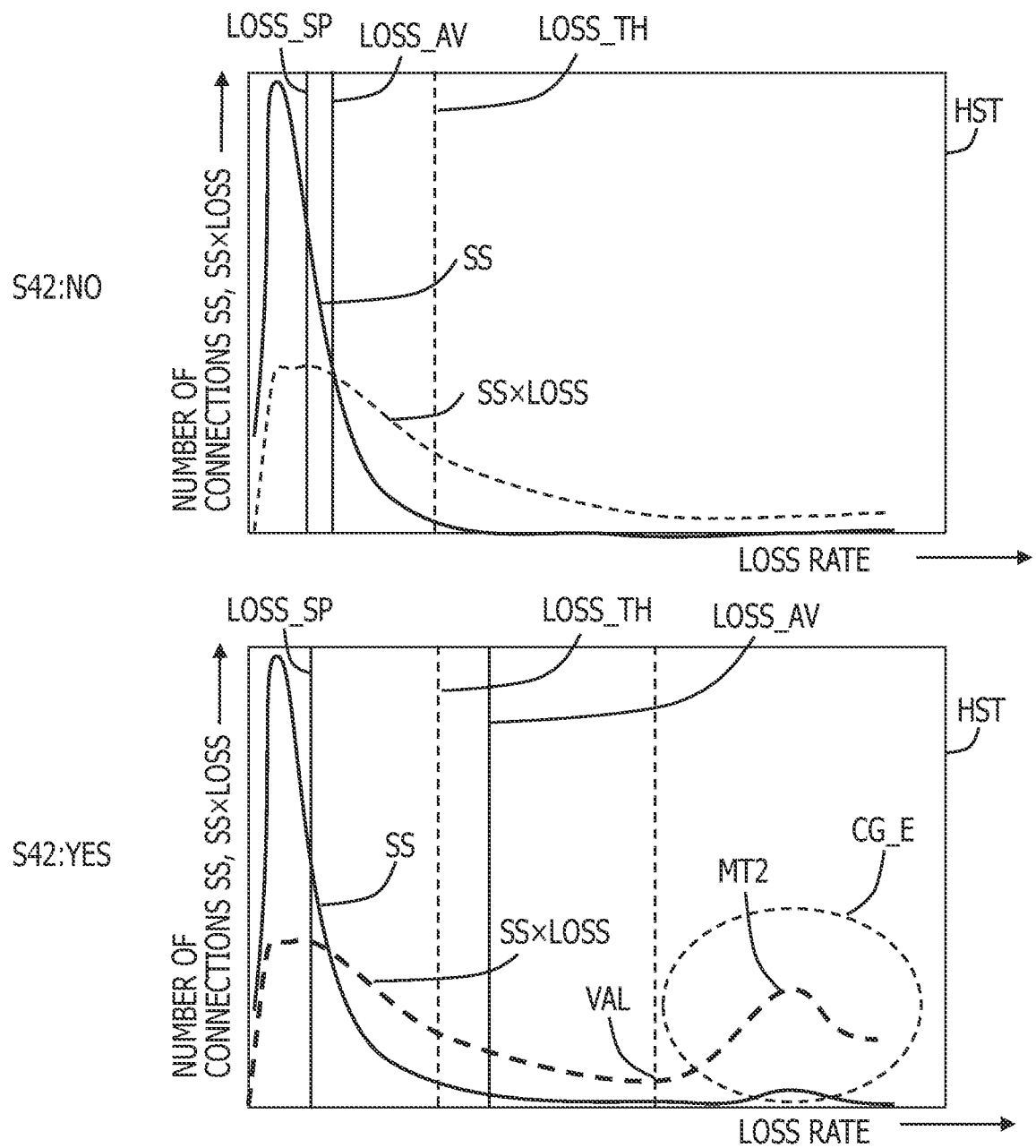
FIGS. 20, 21, and 22 are graphs each illustrating the distribution peak detection processing step S42.
Figure 21:
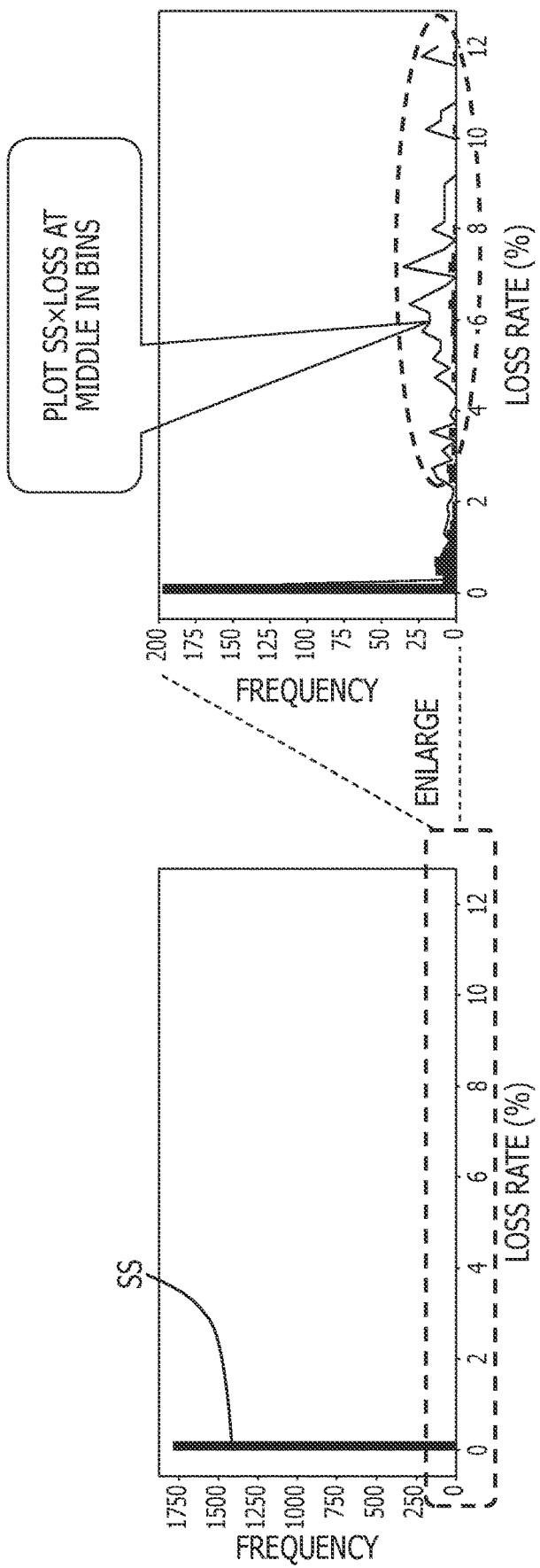
Figure 22:
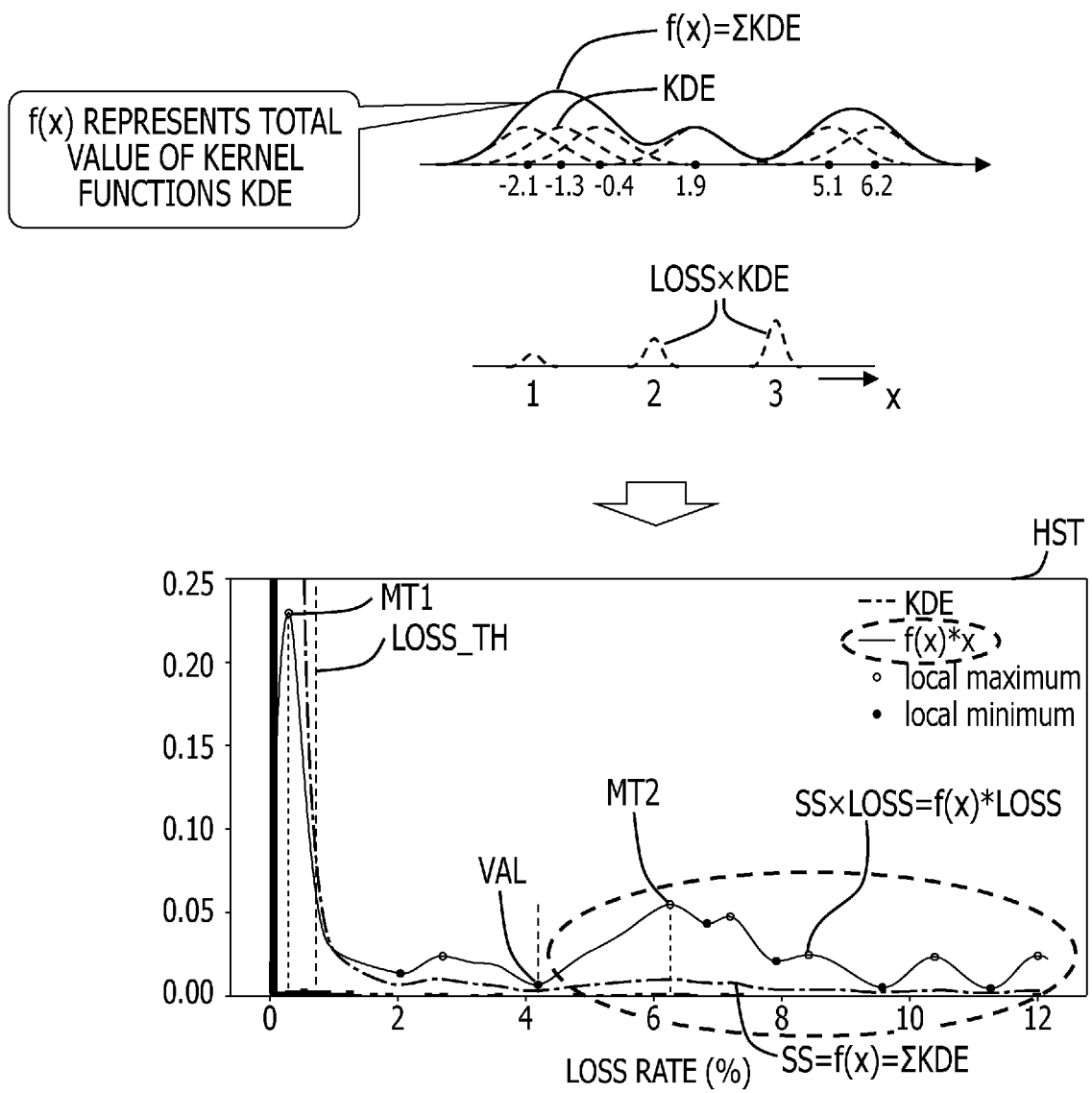

FIGS. 20, 21, and 22 are graphs each illustrating the distribution peak detection processing step S42. FIG. 20 illustrates an example of histograms in a case S42: NO where no distribution peak is detected and in a case S42: YES where a distribution peak is detected. In either of the histograms, a class (bins) along a horizontal axis represents the packet loss rate LOSS, while a frequency along a vertical axis represents the number of connections SS or Numbers of Connections×Packet Loss Rate (SS×LOSS).

When the number of connections SS (solid line) is used as the frequency of the histogram, the distribution peak MT2 in the case S42:YES where a distribution peak is detected has a low peak height and hard to detect. Accordingly, in the present embodiment, Numbers of Connections Packet Loss Rate (SS×LOSS) is used as the frequency of the histogram. Specifically, the distribution peak MT2 is detected based on a distribution (broken line) using a value obtained by multiplying the number of connections SS by a weight of the packet loss rate LOSS as the frequency. By multiplying the number of connections SS by the weight of the packet loss rate LOSS, it is possible to enlarge the distribution peak MT2 in the region where the packet loss rate is particularly high.

A left side of FIG. 21 illustrates a histogram using the number of connections SS as a frequency. A right side of FIG. 21 illustrates a histogram in a region where the number of connections SS is small in enlarged relation. The histogram generated by the processor is a line graph obtained by plotting the number of connections SS in each of the bins illustrated on the right side of FIG. 21. Since the line graph represents discontinuous peaks, when the processor, based on the line graph, detects whether or not a distribution peak is present in the region where the loss rate is high, the detection is not easy.

Accordingly, in the present embodiment, as illustrated in FIG. 22, the processor plots the distribution (shown as KDE) of the number of connections SS obtained by kernel density estimation KDE on the horizontal axis (Loss Rate) of the histogram, and determines a KDE total value $f(x)=\Sigma KDE$. The distribution of $f(x)$ is a smooth distribution of the number of connections SS. The processor further multiplies the kernel density estimation KDE by the loss rate LOSS to determine the total value $LOSS \times f(x)=\Sigma(LOSS \times KDE)$ of LOSS×KDE. A distribution of LOSS×$f(x)$ corresponds to a smooth distribution of SS×LOSS.

In the present embodiment, the processor performs determination S42 of whether or not there is the distribution peak at the high loss rate based on the distribution of the total value $LOSS \times f(x)=\Sigma(LOSS \times KDE)$ of LOSS×KDE obtained by multiplying the kernel density estimation KDE of the number of connections SS by the loss rate LOSS, not on the distribution of the histogram obtained by multiplying the number of connections SS by the loss rate LOSS as FIG. 21. This allows the processor to relatively easily detect the distribution peak at the high loss rate through an arithmetic operation.

Returning to FIG. 17, the processor detects the individual-analysis-target connection group CG_E including, in a high proportion, the connections included in the detected distribution peak MT2 at the high loss rate, and separates the individual-analysis-target connection group CG_E from the other connection groups CG_A to CG_D (S43). Then, the processor performs individual JIT analysis of each of the individual-analysis-target connection group CG_E and the other connection groups CG_A to CG_D.

In the JIT analysis, first, the processor acquires, from the data DB1 in the network analyzation device, the network analysis data D1 during a training data production target period (three weeks previous to the abnormal determination period) which is required (to be used) for the JIT analysis during the abnormal determination period (S44). Then, the processor produces, from the acquired network analysis data D1, the training data DB2 for each of the connection groups separated from each other (S545). The processing steps S44 and S45 are equivalent to performing the processing steps S21_1 to S21_3 for the data production illustrated in FIG. 11 for each of the connection groups separated from each other. Then, the processor performs the JIT analysis of each of the connection groups separated from each other (S46). The JIT analysis is performed based on the processing illustrated in FIG. 4 by using the training data D62 and the aggregated data DB3_2 of the network analysis data DB3_1 for each of the connections during the abnormal determination period acquired in the processing step S40.

Figure 23:
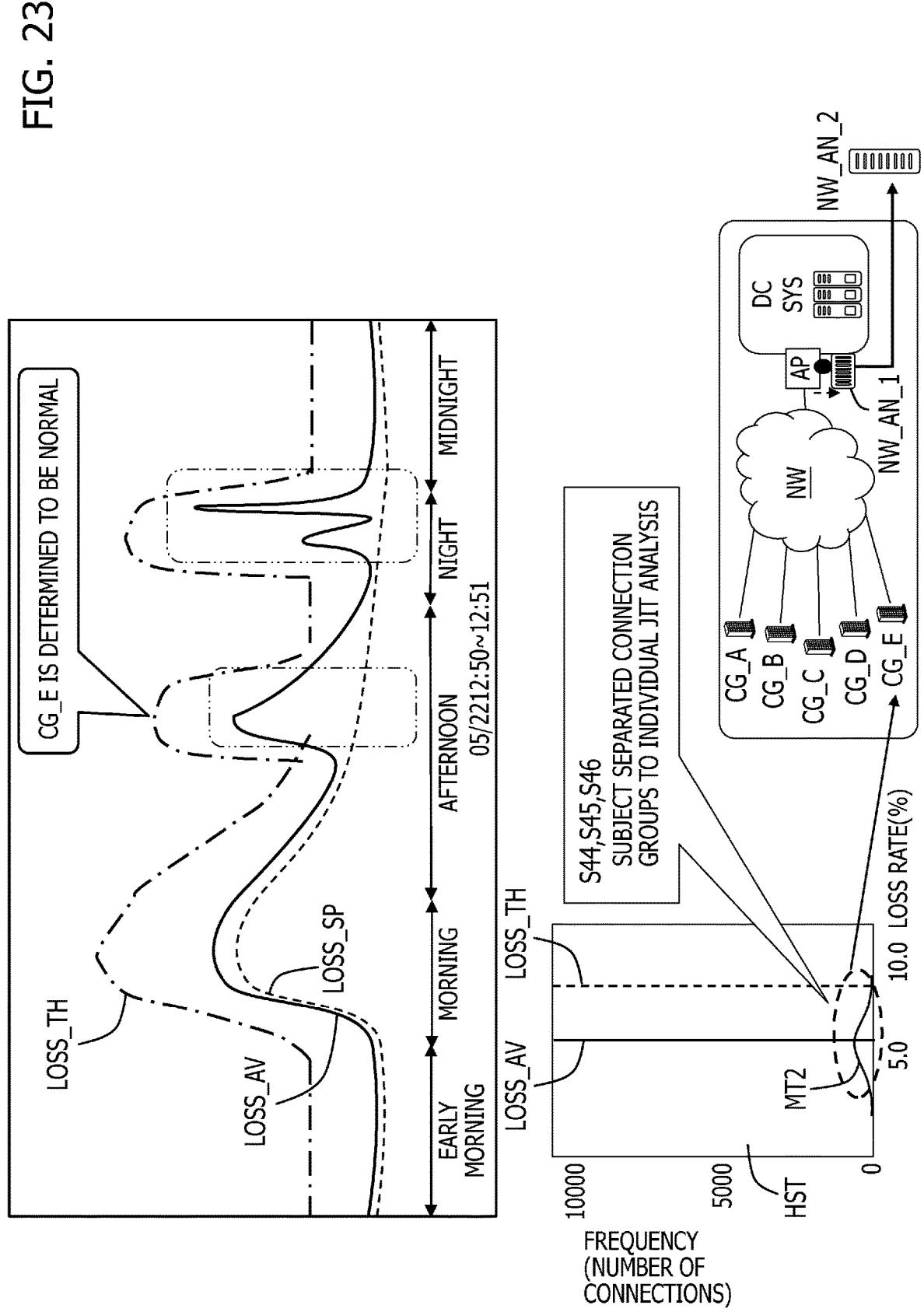
FIG. 23 is graph illustrating the 3I1 analysis performed on the individual-analysis-target connection group CG_E.

FIG. 23 is graph illustrating the 311 analysis performed on the individual-analysis-target connection group CG_E. As illustrated FIG. 18, during the period from 12:50 to 12:51 on 5/22, all the connection groups were subjected to the collective JIT analysis and determined to be abnormal. Meanwhile, as illustrated in FIG. 23, during the period from 12:50 to 12:51 on May 22, the individual-analysis-target connection group CG_E was determined to be normal based on LOSS_AV<LOSS_TH according to the JIT analysis. In the histogram HST illustrated in FIG. 23, the connections each having the high packet loss rate form the distribution peak MT2 based on the connection data of the individual-analysis-target connection group CG_E. Accordingly, the average value LOSS_AV of the packet loss rates in the aggregated data DB3_2 of the network analysis data in each time period is in the vicinity of the distribution peak MT2. Meanwhile, in the individual-analysis-target connection group CG_E, the packet loss rates in the connections in the training data tend to be high, and consequently the estimated value LOSS_SP of the packet loss rate in the local linear model is high, and the abnormality determination threshold LOSS_TH is also high. As a result, the average value LOSS_AV is lower than the abnormality determination threshold LOSS_TH, and the result of the JIT analysis of the connection group CG_E indicates no abnormality.

Specific Example of Network Analysis

Figure 28:
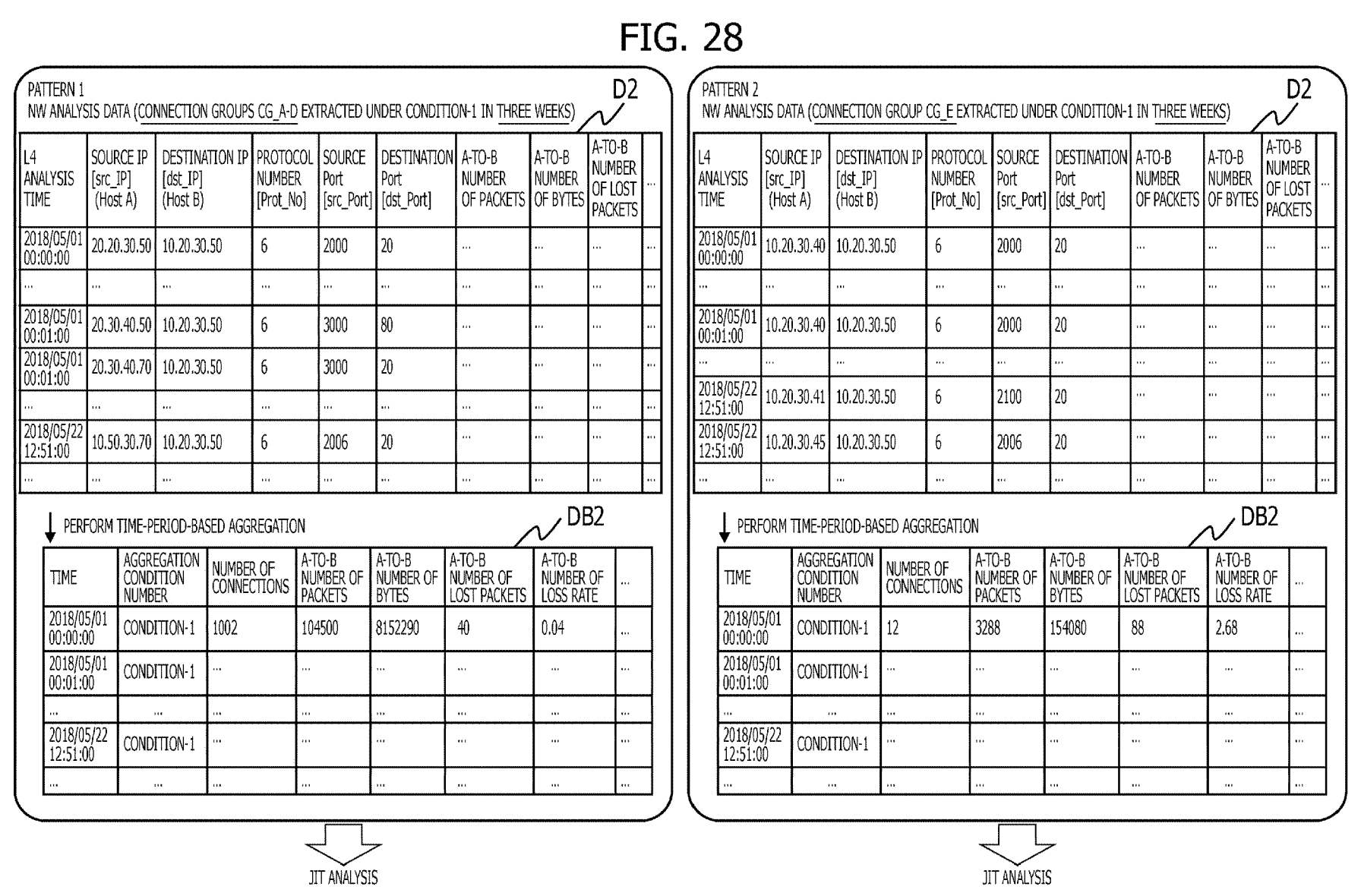

FIG. 28 is a chart illustrating an example of the training data DB2 for each of the connection groups in the processing steps S44 and S45. Pattern 1 illustrates the network analysis data D2 for the connection groups CG_A to CG_D corresponding to the three weeks and the training data DB2 obtained by aggregating the network analysis data D2 in each unit time. The network analysis data D2 is data subjected to conditional extraction. Meanwhile, Pattern 2 illustrates the network analysis data D2 for the individual-analysis-target connection group CG_E corresponding to the three weeks and the training data 082 obtained by aggregating the network analysis data D2 in each unit time.

In Pattern 1, source IP addresses are IP addresses 10.20.30.50 and 10.20.30.70 included in the connection groups CG_A to CG_D. Meanwhile, in Pattern 2, source IP addresses are IP addresses 10.20.30.40 to 10.20.30.45 included in the individual-analysis-target connection group CG_E. In addition, the loss rate in the training data DB2 in Pattern 1 is low at 0.04, while the loss rate in the training data D82 in Pattern 2 is as high as 2.68.

The training data sets in Patterns 1 and 2 are respectively used for the in analysis of the connection groups CG_A to CG_D and the JIT analysis of the individual-analysis-target connection group CG_E.

FIG. 29 is a chart illustrating an example of network analysis data DB3 for each of the connection groups during the abnormal determination period in the processing step S40. Pattern 1 illustrates the network analysis data DB3_1 for the connection groups CG_A to CG_D during the abnormal determination period and the aggregated data (network analysis data) DB3_2 obtained by aggregating the network analysis data DB3_1 in each unit time. The network analysis data DB3_1 is data subjected to conditional extraction. Meanwhile, Pattern 2 illustrates the network analysis data DB3_1 for the individual-analysis-target connection group CG_E during the abnormal determination period and the aggregated data (network analysis data) DB3_2 obtained by aggregating the network analysis data DB3_1 in each unit time. The network analysis data DB3_1 is also the data subjected to conditional extraction. The source IP addresses and the packet loss rates in Patterns 1 and 2 are the same as in FIG. 28.

The respective aggregated data sets (network analysis data sets) DB3_2 in Patterns 1 and 2 in FIG. 29 are respectively used for the JIT analysis of the connection groups CG_A to CG_D and the JIT analysis of the individual-analysis-target connection group CG_E.

As described above, in the network analysis device according to the present embodiment, when the abnormality determination is performed for the plurality of connection groups collectively, the presence of the connection group as a factor causing abnormality is determined. When there is the connection group serving as the factor causing abnormality, the individual-analysis-target connection group CG_E serving as the factor causing abnormality and the connection groups CG_A to CG_D other than the individual-analysis-target connection group CG_E are subjected to the individual (separate) JIT analysis.

Consequently, it is possible to check whether the abnormality determination when the plurality of connection groups is collectively determined is erroneous or not. According to the embodiment, it is possible to increase accuracy of network analysis.

In addition, in the embodiment, the network analyzation device generates the network analysis data DB1 for connections. However, the network analysis data generated by the network analyzation device is not lit ted thereto. The network analysis data generated by the network analyzation device may also be network analysis data for sessions.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing therein a computer readable network analysis program for causing a computer to execute processing including:

performing local modeling analysis which determines an estimated value of a current network quality corresponding to explanatory variable vector in current aggregated data based on a local model including local training data, a network connecting between a plurality of communication node groups, each of which includes a plurality of communication nodes belonging to one or a plurality of sub-networks at individual bases, and a service system, and a plurality of connections being established between the plurality of connection node groups and the service system, the local training data including explanatory variable vectors that are within a predetermined distance from an explanatory variable vector in the current aggregated data among explanatory variable vectors in previous training data, the previous training data being time-period-based training data that is obtained by aggregating, in a plurality of connection groups each including the plurality of connections with same communication node group as a source or a destination, previous network analysis data of connections which is obtained by acquiring packets in the plurality of connection groups on a communication path of the network and analyzing the acquired packets, and the current aggregated data being obtained by aggregating, in the plurality of connection groups, current network analysis data of connections;

determining an abnormality in the network based on whether or not a measured value of the current network quality is lower than an abnormality determination threshold calculated based on the estimated value;

performing distribution determination for determining whether or not a distribution peak of number of connections having the measured value of the network quality exceeding the abnormality determination threshold is present in a size equal to or larger than a predetermined size in a distribution of number of connections to the measured value of the network quality of the network analysis data for the connections during an abnormal time block during which the abnormality in the network is determined;

extracting, as an individual-analysis-target connection group, a specified connection group with equal to or more than a standard proportion of connections in the distribution peak of the number of connections having the size equal to or larger than the predetermined size; and performing the local modeling analysis individually for the previous training data and the current aggregated data for the individual-analysis-target connection group and the previous training data and the current aggregated data for those of the plurality of connection groups other than the individual-analysis-target connection group to determine the abnormality in the network.

2. The non-transitory computer-readable storage medium according to claim 1, wherein the local modeling analysis includes:

generating, based on the local model, a local linear model for calculating the estimated value from the explanatory variable vector; and calculating, based on the local linear model, the estimated value with respect to the explanatory variable vector in the current aggregated data.

3. The non-transitory computer-readable storage medium according to claim 1, wherein the processing further includes:

not generating an alarm reporting the abnormality in the network when determining that the individual-analysis-target connection group and the other connection groups do not correspond to the abnormality in the network.

4. The non-transitory computer-readable storage medium according to claim 3, wherein the processing further includes:

setting an appropriate range based on a dispersion of the local model by multiplying the dispersion by a factor; and increasing, when a feedback returned from a receiver of the alarm in response to the alarm indicates that the alarm is inadequate, a value of the factor to enlarge the appropriate range.

5. The non-transitory computer-readable storage medium according to claim 1, wherein the distribution determination includes:

generating, for the network analysis data for the connections during the abnormal time block, a histogram in which the measured value of the network quality is allocated to bins of the histogram, and a value obtained by multiplying the number of the connections by the measured value is used as frequency of the histogram, and determining whether or not the distribution of the connections having the measured value of the network quality exceeding the abnormality determination threshold has a distribution peak having a size equal to or larger than a predetermined size in the histogram.

6. The non-transitory computer-readable storage medium according to claim 5, wherein the histogram generation included in the distribution determination includes:

placing, for the plurality of respective connections during the abnormal time block, modified kernel functions each obtained by multiplying a kernel function centering around the measured value by the measured value at positions of the measured values in the histogram and generating, as the histogram, a distribution curve using a value obtained by adding up the plurality of placed modified kernel functions as the number of the bins; and determining whether or not the distribution curve has the distribution peak having the size equal to or larger than the predetermined size at a position having the measured value of the network quality exceeding the abnormality determination threshold.

7. The non-transitory computer-readable storage medium according to claim 1, wherein the network analysis data includes the numbers of the connections and quality values each representing the network quality, and each of the previous training data and the current aggregated data each resulting from the aggregation in the plurality of connection groups includes a total of the numbers of the connections and an average of the quality values.

8. The non-transitory computer-readable storage medium according to claim 1, wherein the abnormality determination threshold is calculated by adding, to the estimated value, an appropriate range based on a dispersion of the network quality in the local model.

9. A network analysis device for determining an abnormality in a network, the device comprising:

a processor; and a memory configured to be accessed by the processor, wherein the processor executes:

performing local modeling analysis which determines an estimated value of a current network quality corresponding to explanatory variable vector in current aggregated data based on a local model including local training data, a network connecting between a plurality of communication node groups, each of which includes a plurality of communication nodes belonging to one or a plurality of sub-networks at individual bases, and a service system, and a plurality of connections being established between the plurality of connection node groups and the service system, the local training data including explanatory variable vectors that are within a predetermined distance from an explanatory variable vector in the current aggregated data among explanatory variable vectors in previous training data, the previous training data being time-period-based training data that is obtained by aggregating, in a plurality of connection groups each including the plurality of connections with same communication node group as a source or a destination, previous network analysis data of connections which is obtained by acquiring packets in the plurality of connection groups on a communication path of the network and analyzing the acquired packets, and the current aggregated data being obtained by aggregating, in the plurality of connection groups, current network analysis data of connections;

determining an abnormality in the network based on whether or not a measured value of the current network quality is lower than an abnormality determination threshold calculated based on the estimated value;

performing distribution determination for determining whether or not a distribution peak of number of connections having the measured value of the network quality exceeding the abnormality determination threshold is present in a size equal to or larger than a predetermined size in a distribution of number of connections to the measured value of the network quality of the network analysis data for the connections during an abnormal time block during which the abnormality in the network is determined;

extracting, as an individual-analysis-target connection group, a specified connection group with equal to or more than a standard proportion of connections in the distribution peak of the number of connections having the size equal to or larger than the predetermined size; and performing the local modeling analysis individually for the previous training data and the current aggregated data for the individual-analysis-target connection group and the previous training data and the current aggregated data for those of the plurality of connection groups other than the individual-analysis-target connection group to determine the abnormality in the network.

10. A network analysis method comprising processing of:

performing local modeling analysis which determines an estimated value of a current network quality corresponding to explanatory variable vector in current aggregated data based on a local model including local training data, a network connecting between a plurality of communication node groups, each of which includes a plurality of communication nodes belonging to one or a plurality of sub-networks at individual bases, and a service system, and a plurality of connections being established between the plurality of connection node groups and the service system, the local training data including explanatory variable vectors that are within a predetermined distance from an explanatory variable vector in the current aggregated data among explanatory variable vectors in previous training data, the previous training data being time-period-based training data that is obtained by aggregating, in a plurality of connection groups each including the plurality of connections with same communication node group as a source or a destination, previous network analysis data of connections which is obtained by acquiring packets in the plurality of connection groups on a communication path of the network and analyzing the acquired packets, and the current aggregated data being obtained by aggregating, in the plurality of connection groups, current network analysis data of connections;

determining an abnormality in the network based on whether or not a measured value of the current network quality is lower than an abnormality determination threshold calculated based on the estimated value;

performing distribution determination for determining whether or not a distribution peak of number of connections having the measured value of the network quality exceeding the abnormality determination threshold is present in a size equal to or larger than a predetermined size in a distribution of number of connections to the measured value of the network quality of the network analysis data for the connections during an abnormal time block during which the abnormality in the network is determined;

extracting, as an individual-analysis-target connection group, a specified connection group with equal to or more than a standard proportion of connections in the distribution peak of the number of connections having the size equal to or larger than the predetermined size; and performing the local modeling analysis individually for the previous training data and the current aggregated data for the individual-analysis-target connection group and the previous training data and the current aggregated data for those of the plurality of connection groups other than the individual-analysis-target connection group to determine the abnormality in the network.

* * * * *